United States Patent
Bonnain et al.

(10) Patent No.: US 8,322,514 B2
(45) Date of Patent: Dec. 4, 2012

(54) SYSTEM FOR PROCESSING ARTICLES

(75) Inventors: Jean-Christophe Bonnain, Chateauroux (FR); Pascal Martini, LePoinconnet (FR)

(73) Assignee: Meadwestvaco Packaging Systems, LLC, Richmond, VA (US)

( * ) Notice: Subject to any disclaimer, the term of this patent is extended or adjusted under 35 U.S.C. 154(b) by 174 days.

(21) Appl. No.: 12/918,250

(22) PCT Filed: Mar. 3, 2009

(86) PCT No.: PCT/US2009/035805
§ 371 (c)(1),
(2), (4) Date: Sep. 24, 2010

(87) PCT Pub. No.: WO2009/114332
PCT Pub. Date: Sep. 17, 2009

(65) Prior Publication Data
US 2011/0036684 A1    Feb. 17, 2011

(30) Foreign Application Priority Data
Mar. 3, 2008  (GB) .................................. 0803910.9

(51) Int. Cl.
*B65G 47/26* (2006.01)
(52) U.S. Cl. ..................................... 198/430; 198/470.1
(58) Field of Classification Search .................. 198/426, 198/427, 430, 431, 432, 433, 470.1, 471.1, 198/478.1, 441
See application file for complete search history.

(56) References Cited

U.S. PATENT DOCUMENTS

| 1,775,381 | A | * | 9/1930 | Angus ......................... 198/477.1 |
| 4,164,997 | A | | 8/1979 | Mueller |
| 4,697,691 | A | * | 10/1987 | Zodrow et al. ................. 198/426 |
| 6,112,880 | A | * | 9/2000 | Flix .............................. 198/419.2 |
| 7,997,401 | B2 | * | 8/2011 | Fischer ......................... 198/411 |

FOREIGN PATENT DOCUMENTS

| EP | 0230293 A2 | 7/1987 |
| EP | 0741090 A2 | 11/1996 |
| FR | 2259770 A | 8/1975 |
| GB | 372106 A | 5/1932 |
| GB | 2245537 A | 1/1992 |
| GB | 2297955 A | 8/1996 |

* cited by examiner

*Primary Examiner* — James R Bidwell
(74) *Attorney, Agent, or Firm* — MWV Intellectual Property Group

(57) ABSTRACT

An article configuration system comprising a first conveyor (90) for transferring articles (B) from an input and a second conveyor (88), disposed at a non-linear angle relative to the first conveyor, for transferring articles to an output. The article processing system comprises a mechanism (30) for transferring articles from the first conveyor (90) to the second conveyor (88). The mechanism (30) is structured and arranged to facilitate the reorganization of articles conveyed by the first conveyor such that when transferred to the second conveyor the articles are disposed in adjacent metered lanes (124*a*-124*f*) and wherein the number of adjacent metered lanes of articles conveyed by the second conveyor (88) is greater than the number of adjacent lanes of articles (100, 102) conveyed by the first conveyor.

14 Claims, 17 Drawing Sheets

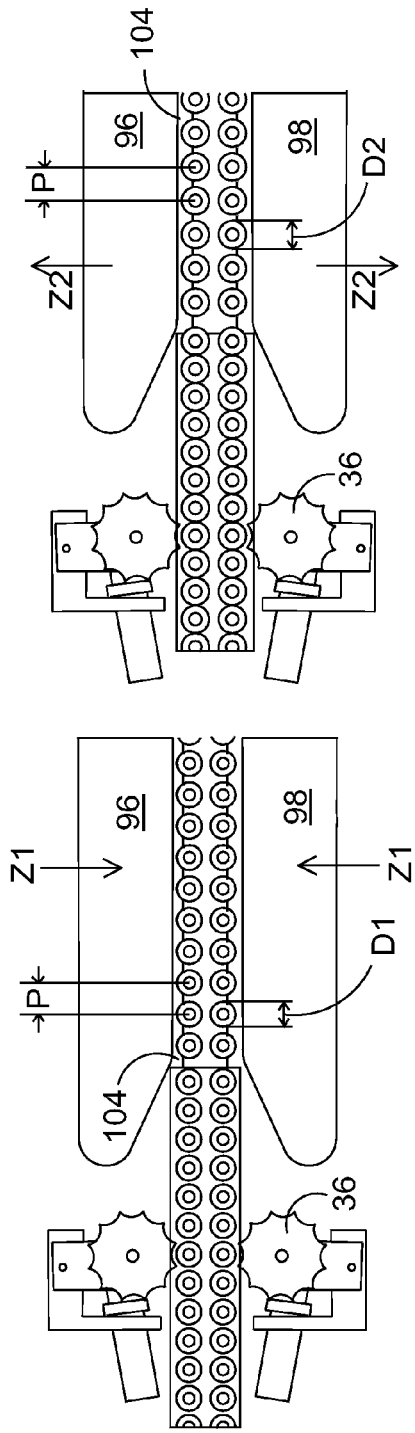
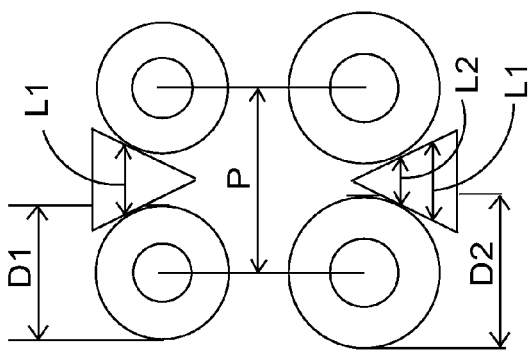
FIGURE 4A
FIGURE 4B
FIGURE 4C

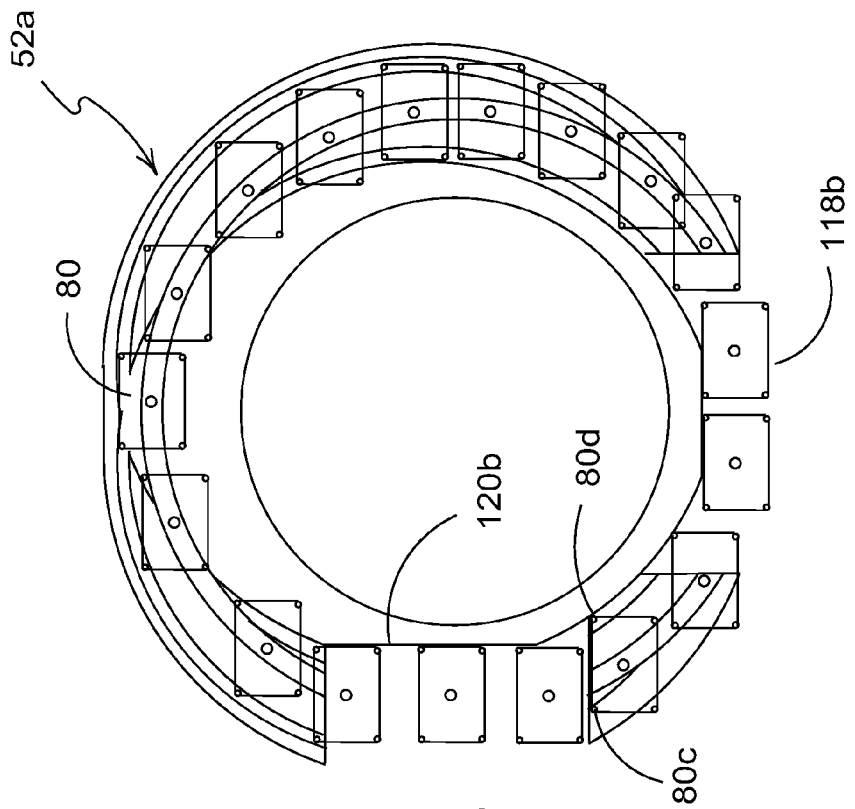
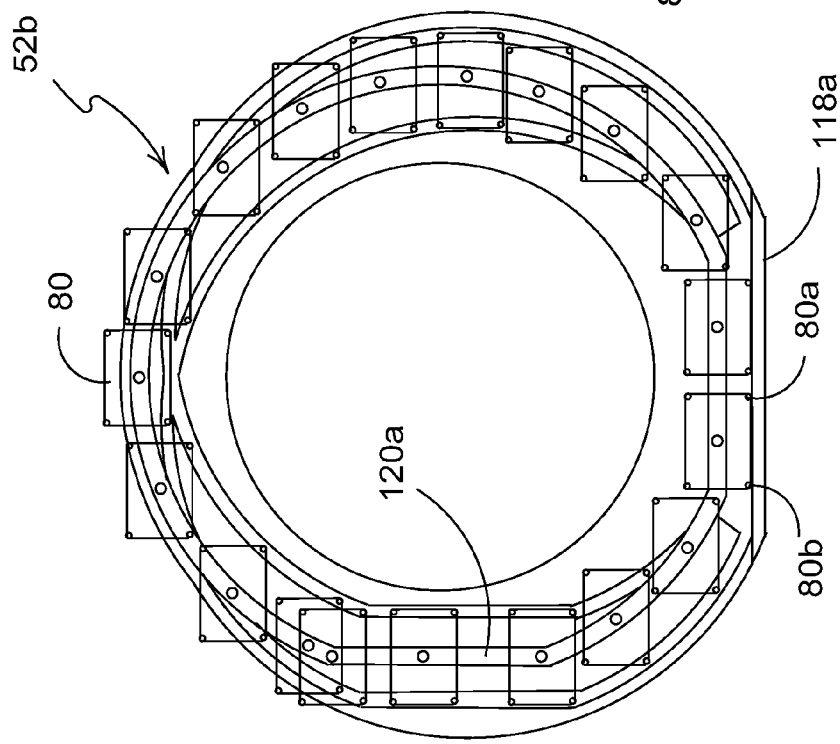

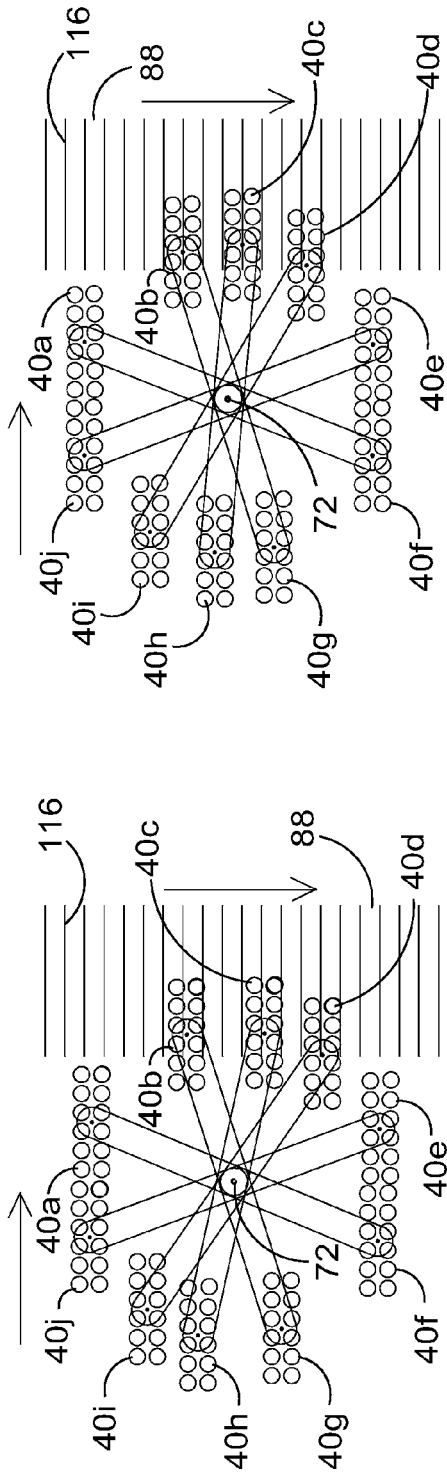
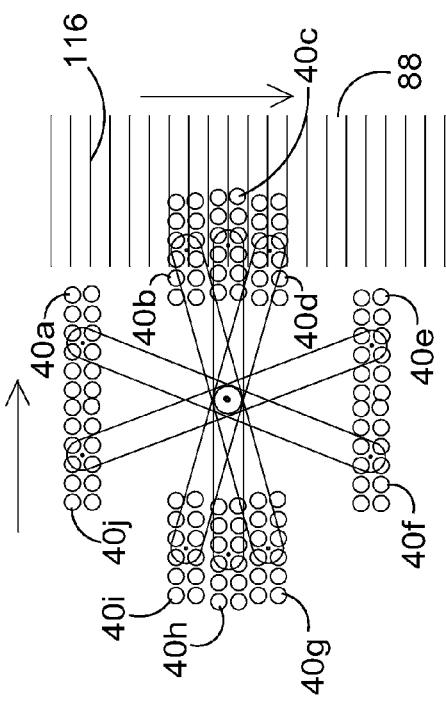
FIGURE 13A
FIGURE 13B
FIGURE 13C

SYSTEM FOR PROCESSING ARTICLES

FIELD OF THE INVENTION

The invention relates to the field of article packaging and article processing. Specifically but not exclusively, the invention relates to an apparatus for and method of metering; grouping and aligning articles.

BACKGROUND OF THE INVENTION

In the field of packaging it is required to provide adaptable machines and sub-assemblies that are capable of packaging a variety of types of primary article, such as cans and bottles, into secondary packages (cartons) that contain or hold together an array of articles in a multipack. It is known to provide such multipacks to subsequent sub-assemblies for collating a number of multipacks or cartons into a tertiary package.

In the interests of economic and efficient packaging, it is required to achieve the highest throughput of packaged primary articles and to ensure that the output of a primary processing line, for example a bottling line is not limited by the speed of operation of a secondary packaging line. In addition; the linear size and/or floor space of a packaging line; the types of article; and the type of carton that can be accommodated by a packaging line are important considerations. Higher throughputs can be achieved if machine lines can be run faster; however this is not always possible when manipulation of cartons introduces complexities that limit the run-speed and often greater linear size of packaging machine is required where run-speeds are higher. Additionally, running at high-speeds can cause components of a machine to suffer wear and damage due to friction and heat. This in turn can cause down time to the packaging machine and potentially the entire bottling line, as well as costly repair to the machines.

It is therefore advantageous to optimise machine output in other ways than simply increasing the machine run-speed. It is also desirable to provide packaging and processing assemblies that are versatile and can take articles output from a primary processing line and manipulate them in a variety of ways. It is known to package primary articles in groups into secondary packaging cartons. Typically if it is required to produce secondary articles in a certain grouped array, for example 2×3, then a packaging machine that can meter such articles; group the articles and then manipulate secondary packaging cartons, such that a group of six articles is packaged into such an array is used. Then, if it is required to change to packaging articles in groups of eight in say a 2×4 array, either an entirely different packaging machine is required or significant downtime of the packaging machine is necessary in order to change over certain parts of the machine, so that metering grouping and packaging of the primary articles in different configurations can be achieved. Downtime can impact the entire processing line and can inhibit production of the primary articles in say the bottling line.

Many known machines are capable only of packaging one type of carton and bottling plants can be required to use a plurality of machines to package different carton types; each machine takes up considerable floor space and can be expensive to purchase and operate. Each of the machines typically has a separate infeed of articles. It is desirable to have packaging machines that are adaptable for accommodating a variety of articles; carton types and carton sizes. It is also desirable to minimise the linear size of packaging machines to reduce the amount of floor space occupied.

The present invention seeks to provide a number of advantages or improvements in the field of packaging and article processing.

SUMMARY OF INVENTION

Accordingly, a first aspect of the invention, provides, an article configuration system comprising a first conveyor for transferring articles from an input and a second conveyor, disposed at a non-linear angle relative to the first conveyor, for transferring articles to an output, the article processing system comprising a mechanism for transferring articles from the first conveyor to the second conveyor, said mechanism being structured and arranged to facilitate the reorganisation of articles conveyed by the first conveyor such that when transferred to the second conveyor the articles are disposed in adjacent metered lanes and wherein the number of adjacent metered lanes of articles conveyed by the second conveyor is greater than the number of adjacent lanes of articles conveyed by the first conveyor.

Preferably, the mechanism for transferring articles comprises a plurality of elements each structured and arranged for releasably gripping articles in a configured group for transferring configured groups of articles from a first position to a second position, each of said elements being moveable between the first and second positions independently with respect to other of said elements such that each element is moveable at variable angular velocity between said first and second positions.

Preferably the mechanism for transferring articles is operable to lift a number of articles in a group configured to have a transverse number of articles by longitudinal number of articles of N by W and transferring and manipulating said group to said second conveyor such that said number of articles is deposited on said second conveyor in a group configured to have a transverse number of articles by longitudinal number of articles of W by N, wherein N and W are each integer numbers and wherein W is greater than N. Even more preferably, N=2 and W=6.

Preferably a rearranging mechanism is disposed downstream of said mechanism for transferring articles, said rearranging mechanism operable to lift, relocate and deposit one or more articles thereby to rearrange said articles disposed in a greater number of adjacent metered lanes conveyed by said second conveyor into an outgoing stream of articles having a different configuration. The different configuration being different compared to the initial configuration of article as determined by the mechanism for transferring articles.

According to a second aspect, the invention provides a transfer device or mechanism for transferring articles comprising a plurality of elements each structured and arranged for releasably gripping articles in a configured group for transferring configured groups of articles from a first position to a second position, each of said elements being moveable between the first and second positions independently with respect to other of said elements such that each element is moveable at variable angular velocity between said first and second positions. Preferably, the plurality of elements are arranged to rotate about a central axis of the transfer device.

Preferably, the transfer device or mechanism for transferring articles comprises a plurality of elements each structured and arranged for releasably gripping articles in a configured group for transferring configured groups of articles from a first position to a second position, wherein each element is mounted upon an independently controllable arm for rotational movement of each element and wherein each arm is coupled to its own drive means such that movement of each arm is independently controllable. Optionally, the drive means for each independent arm is affixed to each independent arm and moves with said independent arm.

Preferably, each element for releasably gripping articles is mounted to an independent aim by means of a first moveable mount coupled to a first guide path, which first guide path is structured and arranged to control the position of said first moveable mount in a first dimension or plane relative to said independent arm and thereby control the position of said element at and between each of said first and second positions.

Optionally, the independently controllable drive means of each arm are operable to drive an element alongside adjacent lanes of articles conveyed by a first conveyor at the same speed as a first conveyor and operable to drive that element alongside adjacent lanes of a second conveyor at the same speed as that second conveyor.

Preferably, between matching the speed of a first conveyor and matching the speed of a second conveyor the controllable drive means is operable to drive the element at an appropriate angular velocity such that the element arrives at the second conveyor in alignment with lanes of that second conveyor and matches the speed of that second conveyor.

Optionally, each element comprises an array of gripping tools, each gripping tool for releasably holding an article, wherein each gripping tool of the array of gripping tools are mounted to the element such that they are each moveable relative to one another for adjusting the relative spacing of articles picked up and placed by the tool head.

Optionally, the second conveyor comprises a series of moving transverse dividers and the transfer mechanism deposits a group of articles either side of one of said moving transverse dividers to create output article groups having an odd number of articles in the longitudinal direction.

According to a third aspect, the invention provides a rearranging mechanism operable to act on an incoming moving stream of articles, the rearranging mechanism having one or more tools operable to grasp one or more articles simultaneously and said one or more tools moveable relative to said incoming moving stream of articles such that said tools are operable to match the velocity of the moving stream for gripping and lifting articles at a first loading position; operable to match the velocity of the moving stream at a second spaced unloading position, and operable to change velocity and/or position upstream or downstream relative to the moving articles and/or transverse position relative to the moving articles such that said second position is spaced longitudinally and/or transversely relative to said first position and thereby the rearranging mechanism is operable to rearrange an incoming stream of articles into an outgoing stream of articles in spaced groups having a different configuration relative to that of the incoming stream of articles.

According to a further aspect, the invention provides apparatus suitable for metering a stream of articles, the metering apparatus comprising a series of regularly positioned lugs, each lug having a leading and trailing edge which leading and trailing edges are tapered with respect to one another, the spacing between articles metered by the apparatus is adjustable by means for altering the extent to which each tapered lug is inserted into an article stream.

Preferably said apparatus comprises an endless conveyor for holding the series of regularly positioned lugs, the endless conveyor comprising a working reach for conveying articles at regular pitch by means of the regularly positioned lugs being disposed between adjacent articles, said leading and trailing edges being shaped such that the width of the lug increases from a tip of the lug furthest from the endless conveyor to a rear of the lug closest to the endless conveyor, the lugs being arranged such that by adjusting the position of the lugs relative to a stream of articles being metered, each lug provides a greater or lesser spacer between adjacent articles and thereby the apparatus is adaptable to meter a first stream of articles having a first width and a second stream of articles having a second different width, at the same regular pitch.

According to a further aspect, the invention provides apparatus for metering a stream of articles comprising means for conveying a stream of articles along a first path in a first direction and an endless conveyor comprising lugs for engaging articles in the stream, which lugs comprise a leading edge and a trailing edge tapered with respect to one another and wherein said endless conveyor is moveable in a second direction transverse to said first direction. Preferably, the endless conveyor is transversely moveable to accommodate streams of articles of different dimension.

According to a further aspect, the invention provides a method of processing articles comprising:
(i) providing articles in an input stream of N adjacent articles wide; selecting groups of articles from said input stream in a configuration of N articles wide and W articles long;
(ii) successively rotating said selected groups into a configuration of W articles wide and N articles long; and
(iii) simultaneously transferring said rotated selected groups to an output to create and output stream of articles wherein the articles are disposed in adjacent metered lanes and wherein the number W of adjacent metered lanes of articles in said output is greater than the number N of adjacent articles in the input stream.

A further aspect if the invention provides an article processing system comprising a primary conveyor structured an arranged to deliver articles in a stream from an outfeed of a primary processor to one or more secondary processing devices, each of said secondary processing devices comprising a means for metering and configuring articles such that a metered and configured stream of articles is produced by the or each secondary processing device.

BRIEF DESCRIPTION OF THE DRAWINGS

Exemplary embodiments of the invention will now be described with reference to the accompanying drawings, in which:

FIG. 4A shows a first position of operation of the regulator of FIG. 3;

FIG. 4B shows a second position of operation of the regulator of FIG. 3;

FIG. 4C shows a schematic diagram of the pitch of the regulator in the first position of FIG. 4A and second position of FIG. 4C;

FIGS. 9-12 show further views of components of the robotic divider;

FIG. 13A is a schematic illustration of the robotic divider operating in a first mode;

FIG. 13B is a schematic illustration of the robotic divider operating in a second mode;

FIG. 13C is a schematic illustration of the robotic divider operating in a third mode;

Figure 1:
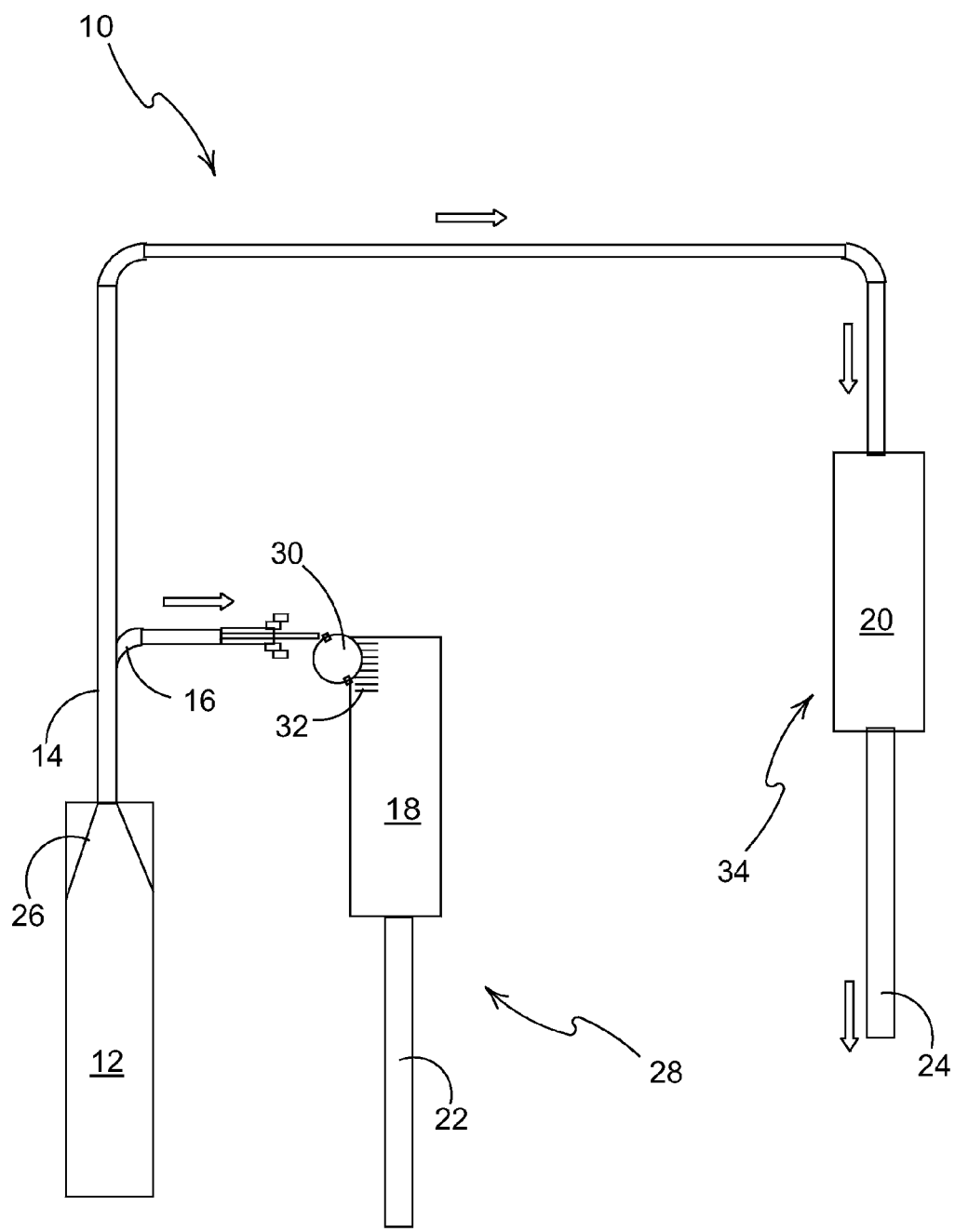
FIG. 1 illustrates schematically an article processing system according to a first embodiment of the invention.

For ease of reference to the features shown in the drawings, a list of features and the reference numerals used to denote them is provided below:

| Reference numeral | Feature |
| --- | --- |
| 10 | article processing system |
| 12 | mass conveyor |
| 14 | stream of articles that is two articles wide |
| 16 | first junction |
| 18 | rearranging mechanism |
| 20 | second rearranging mechanism |
| 22 | first packaging machine |
| 24 | second packaging machine |
| 26 | filtering guides |
| 28 | first sub assembly |
| 30 | robotic divider |
| 32 | second stream of articles |
| 34 | second sub assembly |
| 36 | star wheel |
| 38a-e | independent arm |
| 40a-e | lifting tool |
| 42 | loading section |
| 44 | unloading section |
| 46 | second metering section |
| 48 | rearrangement section |
| 50 | drive means |
| 52 | vertical cam path |
| 52a | lower orientation cam path |
| 52b | upper orientation cam path |
| 54 | circular guide |
| 56 | roller for following trajectory cam path |
| 58 | trajectory cam path |
| 60 | tool orientation cam path |
| 62 | cage ball for following vertical cam path |
| 64 | circular cam path followers |
| 66 | modular sprocket |
| 68 | Hub |
| 70 | vertical guide |
| 72 | Axle |
| 74 | roller for following vertical cam path |
| 76 | cage ball for following trajectory cam path |
| 78 | sliding mount for tool |
| 80 | mount |
| 80a | first orientation cam follower |
| 80b | second orientation cam follower |
| B | Bottles |
| Y | direction of rotation of robotic divider |
| 80c | third orientation cam follower |
| 80d | fourth orientation cam follower |
| 82 | rotary cog |
| 84 | stream of organised and metered articles |
| 86 | regulator |
| 88 | second conveyor |
| 90 | first incoming conveyor |

-continued

| Reference numeral | Feature |
| --- | --- |
| 92 | lugs of first lug chain |
| 94 | lugs of second lug chain |
| 96 | first lug chain table |
| 98 | second lug chain table |
| 100 | first lane |
| 102 | second lane |
| 104 | lugs |
| 106 | working reach |
| 108 | return reach |
| 110 | interception reach |
| 112 | second guide |
| 114 | gripping tools |
| 116 | lane dividers |
| 118 | first linear portion of trajectory cam path |
| 120 | second linear portion of trajectory cam path |
| 118a | first linear portion of upper orientation cam path |
| 120a | second linear portion of upper orientation cam path |
| 118b | first linear portion of lower orientation cam path |
| 120b | second linear portion of lower orientation cam path |
| 122a-h | rearranger tool head |
| 124a | first lane |
| 124b | second lane |
| 124c | third lane |
| 124d | fourth lane |
| 124e | fifth lane |
| 124f | sixth lane |
| 126a | incoming group |
| 128a-c | rearranged group |
| 130a-d | Arms |
| 132 | Controller |
| 134 | Platform |
| 136a | second type of rearranger tools |
| 138 | Rotating arm |
| O | outfeed direction |
| X | infeed direction |

DETAILED DESCRIPTION OF EXEMPLARY EMBODIMENTS

Reference is made to the Figures generally throughout the following description. An article processing system 10 of a first embodiment of the present invention is shown in FIG. 1. Primary articles B such as bottles or cans output in a non-uniform and rapid manner from a filling or bottling line (not shown) are delivered on a mass conveyor 12. Filtering guides 26 funnel an incoming mass of primary articles B into first and second lanes 100, 102 to create an incoming stream 14 of articles B that is two articles B wide. The articles B in the incoming stream 14 are conveyed in first and second lanes 100, 102 and the pitch between successive articles is not uniform.

A first junction 16 is illustrated in FIG. 1. At this junction a first sub-assembly 28 taps into the incoming stream 14 of articles B. A regulator 86 (not shown in FIG. 1, but described fully below in connection with FIGS. 3-4B) is used to space pairs of articles B from preceding and succeeding pairs of articles B and to control the pitch 'P' between pairs of articles B as they are conveyed into the first sub assembly 28. After the incoming stream 14 of articles B is regulated, the incoming stream 14 is acted upon by a robotic divider 30 that picks up a group of articles B from the regulated stream. Preferably twelve articles in a 6×2 array are successively lifted from the output end of the regulated stream; rotated and placed onto a second conveyor 88. This processing is shown in more detail in FIG. 2 and described in further detail below (with reference to 5-13C). The result is that a second stream 32 of articles B is created which is six articles wide compared to the original width of the incoming stream 14 of two lanes 100, 102. The second stream 32 of articles B is further processed in the first sub-assembly by a rearranging mechanism 18.

Figure 2:
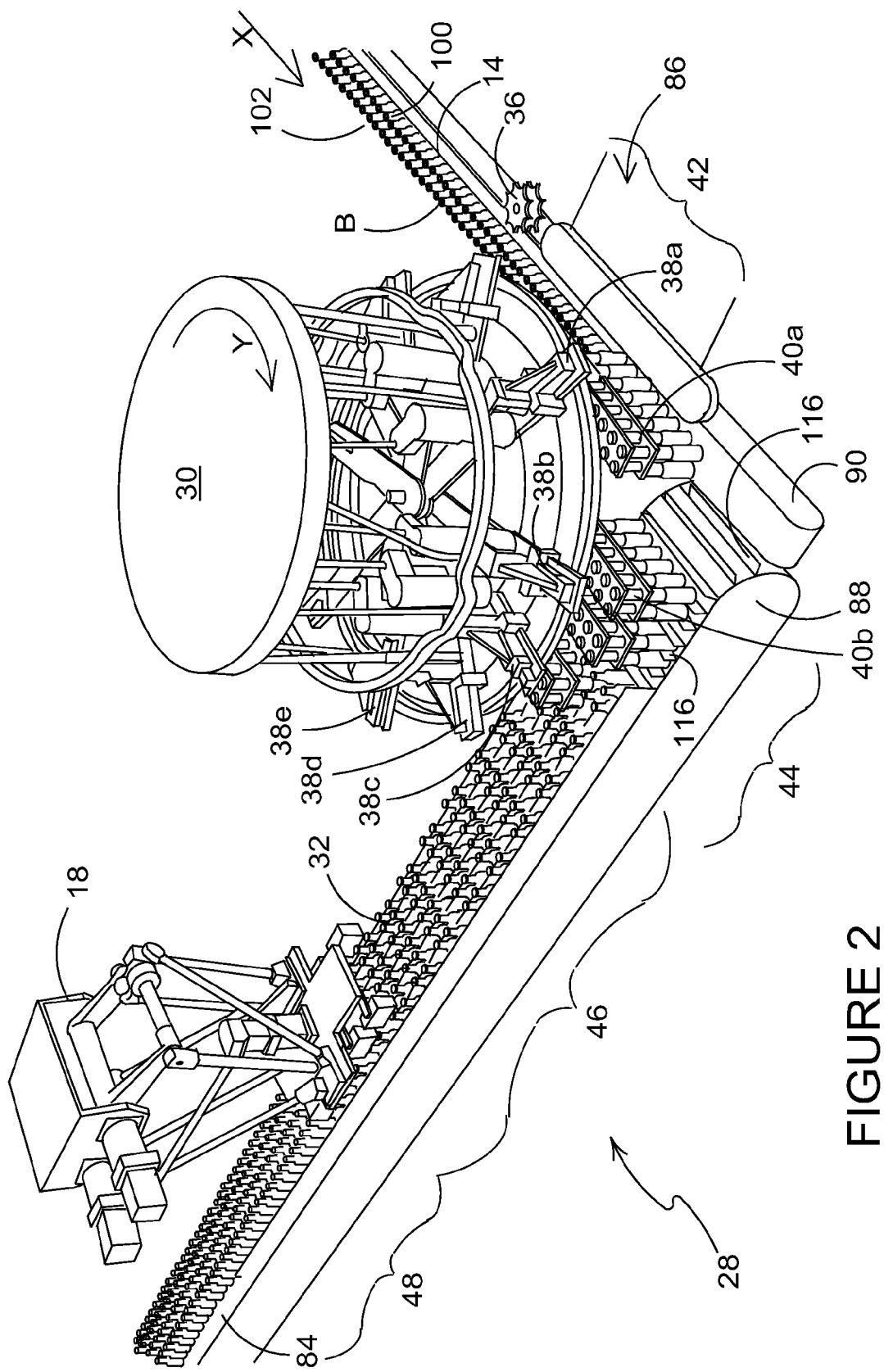
FIG. 2 illustrates a portion of a first sub-assembly of the article processing system of FIG. 1.

The aforementioned mechanisms are shown in greater detail in FIG. 2 which shows an enlarged view of part of the first sub-assembly 28. It is shown that the original incoming stream 14 of articles B is conveyed into the first sub-assembly 28 in the direction X. Regulator 86 comprising a star wheel 36 (and other components described below) ensure that the incoming stream 14 of articles B is ordered, in other words, has a uniform pitch P (see FIG. 3) between successive pairs of articles B. A tool head 40a of the robotic divider 30 acts upon the metered stream of articles in a loading section 42 and simultaneously lifts twelve articles B in a 2×6 array. Six articles are taken from each of the two lanes 100, 102. The robotic divider 30 rotates in direction Y, as indicated in FIG. 2. As the robotic divider 30 rotates the tool head 40a and the lifted group of articles B are moved and oriented into alignment with a second conveyor 88. A preceding tool head 40b is shown in FIG. 2 in an unloading section denoted by reference 44. After unloading of the tool head 40b the continuous rotation of the robotic divider 30 moves that tool head 40b away from the unloading section 44 to return to the loading section 42 to collect and deliver another group of articles B. Meanwhile the immediately succeeding tool head 40a is rotated into alignment with the second conveyor 88. The successive collection and delivery of grouped articles is arranged such that every single article B of the metered incoming stream on first conveyor 90 is transferred in an ordered fashion, preferably in separate physical lanes, to the second conveyor 88, where a metered second stream 32 of articles is thereby created. In this embodiment the metered second stream 32 of articles B is six lanes of articles B wide. The second stream 32 of articles B thus has a greater width than the incoming stream 14 of articles B that is only two lanes 100, 102 wide.

As such an article processing system 10 is provided comprising a first conveyor 90 for transferring articles B from an input and a second conveyor 88, disposed at a non-linear angle relative to the first conveyor 90, for transferring articles to an output, the article processing system comprising a mechanism 30 for transferring articles from the first conveyor 90 to the second conveyor 88. Said mechanism is structured and arranged to facilitate the reorganisation of articles B conveyed by the first conveyor 90 such that when transferred to the second conveyor 88 the articles B are disposed in adjacent metered lanes and wherein the number of adjacent metered lanes of articles conveyed by the second conveyor 88 is greater than the number of adjacent lanes of articles conveyed by the first conveyor 90. The transferring mechanism 30 is operable to lift a number of articles B in a group configured to have a transverse number of articles by longitudinal number of articles of N by W and transferring and manipulating said group to said second conveyor 88 such that said number of articles is deposited on said second conveyor 88 in a group configured to have a transverse number of articles by longitudinal number of articles of W by N, wherein N and W are each integer numbers and wherein W is greater than N. In the example shown N=2 and W=6.

The rearranging mechanism 18 (shown in more detail in FIG. 2) is operable to manipulate the six articles wide second stream 32 into a variety of configurations (the operation and structure of the exemplary rearranging mechanism 18 and alternative variations of operation of such a robot are described below in detail with reference to FIGS. 14A-D). In the embodiment of the article processing system 10 shown, the first sub-assembly 28 is provided with a rearranging mechanism 18 that groups articles into 4×n arrays (where n is an integer greater than zero). This process is undertaken in the second metering section 46. A stream 84 of organised and metered articles in 4×n arrays is output from the rearranging mechanism 18, in other words output from second metering section 46. The regrouped articles are shown generally at 48, where the metered articles in 4×n arrays are fed into a first packaging machine 22 (not shown in FIG. 2). The first packaging machine 22 (see FIG. 1) is set-up to receive blanks (not shown) for forming secondary packages or cartons (not shown) each for containing a 4×n array of primary articles. The first packaging machine 22 is adaptable for packaging other configurations of articles. The first packaging machine 22 is one known in the art such as a packaging machine produced by the applicant. In embodiments where other types of packaging machine are used; the use of a rearranger may not be required or the rearranger may be formed as an integral part of the packaging machine and not provided as a standalone sub-assembly.

Referring back to FIG. 1, it can be seen that stream of two articles wide 14 continues to be conveyed around the article processing system 10. In the embodiment depicted a second sub assembly 34 comprising a regulator (not shown); robotic divider (not shown); second rearranging mechanism 20 and second packaging machine 24 is provided. In other embodiments of the invention it is envisaged that a number of sub-assemblies may be provided each of which can tap into the stream 14 of two articles wide. The number 'N' of sub-assemblies is, in other embodiments, an integer number greater than zero; up to a maximum number of required sub-assemblies that can be accommodated, giving due consideration to practical aspects (considering floor space; through-put; and flexibility). The maximum number of sub-assemblies may also be limited by the output speed of the primary processing line (for example a bottling line). (In an embodiment where each sub-assembly can process a third of the articles being output from the bottling line then, the optimum number 'N' of required subassemblies is three. A fourth sub-assembly would be redundant). The second sub-assembly 34 operates similarly to the first sub-assembly 28 and is not further described.

The article processing system 10 takes a mass of articles nestled in an irregular arrangement output at high speed from a primary processing line and feeds the articles B into a number 'N' (in this example N=2) of sub-assemblies, where the two-lane incoming stream 14 of articles B is regulated and manipulated into a second stream 32 of articles B containing more than two-lanes of articles B. This metered and wider second stream 32 is subject to optional rearrangement and the output stream 84 thereof delivered to a further processing apparatus. In this embodiment the further processing apparatus is a secondary packaging machine 22, 24, where the grouped articles B are each packaged into a multi-pack type carton (not shown). Since the robotic divider 30 is compact and facilitates a change in direction between the incoming stream 14 and outgoing stream 84 of articles, as well as a reorganisation of the number of lanes, a high throughput of article processing can be achieved whilst, at the same time, a reduction in linear machine line, or length or footprint of the machine line is achieved. The saving on floor space; increase in throughput and additionally the flexibility in the article processing system 10 ability to package the articles B output from the primary processing line into secondary packages of various types, sizes and/or configuration (due to the sub assembly being able to output articles B in organised groups of requisite width) all contribute to achieving considerable advantages in article processing and packaging.

The components of each sub-assembly are now described in more detail with reference to the subsequent FIGS. 3 to 14D. Since each sub-assembly has similar components, the components will be described only once it being understood that each sub-assembly comprises a regulator 86; divider robot 30 and rearranging mechanism 18, 20. In an alternative, embodiment of article processing system 10, the regulator 86 is disposed close to the output of the mass conveyor 12 and the incoming stream 14 of two articles B wide is a regulated stream. In this way only one regulator 86 is required for the entire article processing system 10 and each sub-assembly comprises only a divider robot 30 and a rearranging mechanism 18, 20. Furthermore, the rearranging mechanism 18, 20 shown in each sub assembly 28, 34 is optional and in other embodiments, one or more sub-assemblies are not provided with a rearranging mechanism 18, 20.

Figure 3:
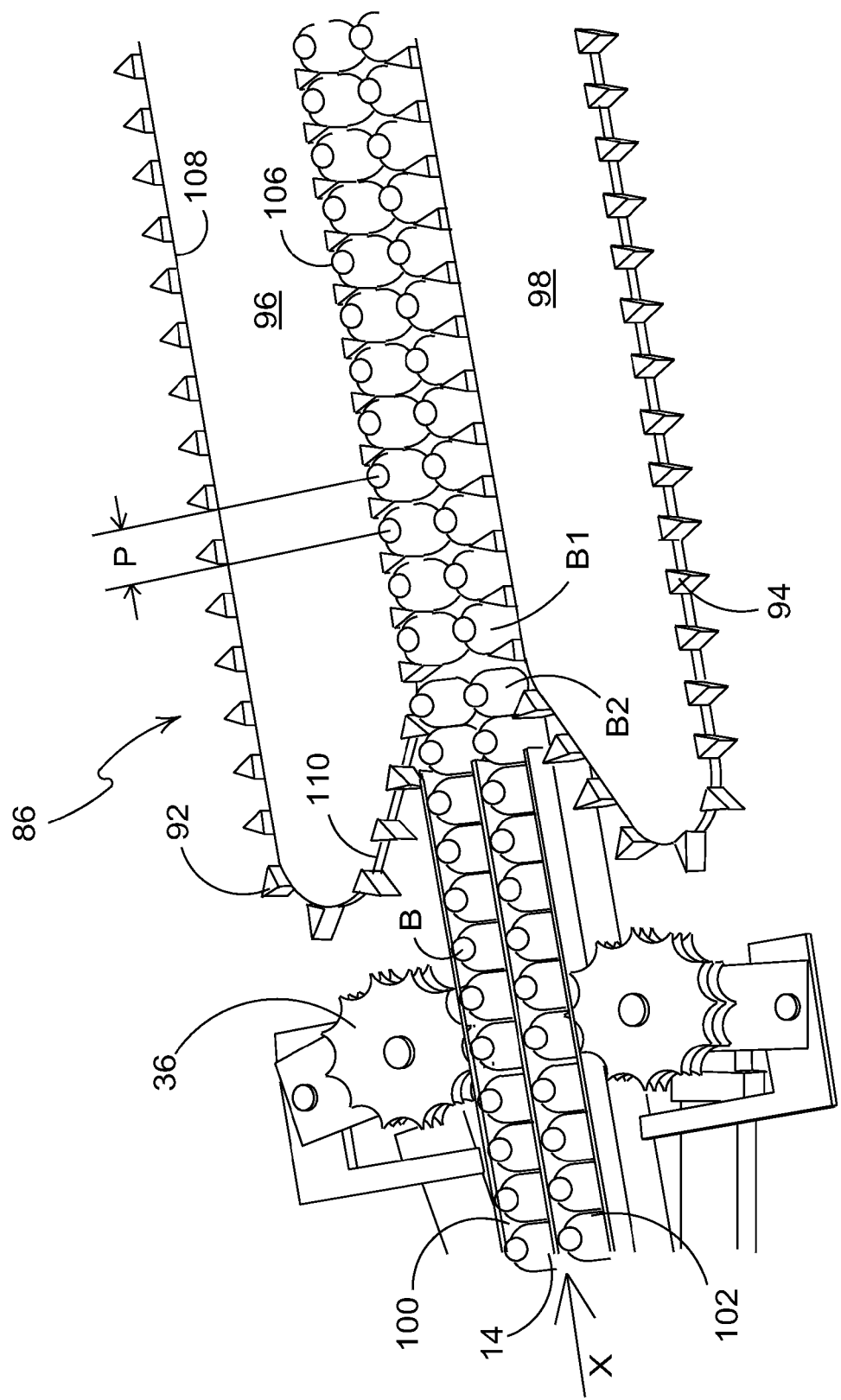
FIG. 3 shows a schematic view from above of part of a regulator or metering device for use in the first sub-assembly of FIG. 2.

The regulator 86 shown in FIG. 2 will now be described in greater detail with reference to FIGS. 3 to 4B. Regulator 86 comprises a pair of star wheels 36 disposed either side of the two lanes 100, 102 of the incoming stream 14 of articles B. Each star wheel 36 acts upon articles B in one of the lanes 100, 102 and initiates a first metering of the articles. Star wheel 36 mechanisms are well known in the art and are not therefore further described here. Subsequently, the articles B, being conveyed in the two lanes 100, 102, are passed between first and second lug chain tables 96; 98. Mounted upon each lug chain table 96, 98 is an endless lug chain (or belt) 92, 94. First lug chain 92 is mounted upon first lug chain table 96 and second lug chain 94 is mounted upon second lug chain table 98. Each of the first and second lug chains 92, 94 comprises a series of equally spaced lugs 104.

Each lug chain table 96, 98 is shaped to have a working reach 106, aligned in parallel to a line of articles B of the incoming stream 14; a return reach 108 and an interception reach 110. The interception reach 110 is angled acutely relatively to the incoming stream 14. Lugs 104 are triangular or at least tapered in shape and a first side of the triangular lug 104 provides a leading edge of the lug 104. The opposed side of the triangular lug 104 provides a trailing edge of the lug 104. During the interception-reach 110 a leading edge of a lug 104 from each of the first and second lug chains 92, 94 contacts a trailing side edge of an article B (see FIG. 3). The first and second lug chains 92, 94 preferably driven at a slightly faster rate than the conveyor of the incoming stream 14 and/or star wheel 36. As a lug 104 from each of the first and second lug chains 92, 94 contacts the side of an article B, the article B is conveyed by that lug 104 at a greater speed than it was previously moving at. This causes a leading article B1 to be accelerated away from a trailing article B2. By the end of the interception reach 110 and/or the start of the working reach 106, the lug 104 is positioned between the leading article B1 an immediately trailing article B2. As successive lugs follow through the interception reach 110 and successively space the articles B of each lane 100, 102, a metered stream of articles that is two articles wide is created and conveyed through the loading section of the first sub-assembly 28. The regular and uniform pitch 'P' between articles B is shown in FIG. 3. The speed of the first and second lug chains 92, 94 is controlled by means of a computer controllable drive means such as a servomotor or electric motor as is known in the art. The control means for the first and second lug chains 92, 94 may be coupled to a central control unit monitoring the speed of articles output from the initial bottling line (not shown) to ensure that the first and second lug chains 92, 94 mate with the incoming article streams 100, 102 at an appropriate speed.

The attitude of the triangular (or tapered) shaped lugs 104 during the interception reach 110 relative to the primary articles B enables the lug 104 to accelerate an article B1, and then take up at least some of the space created between that accelerated article B1 and a successive article B2. The space between adjacent articles B1, B2 is known as the pitch 'P' and can be maintained, even when articles B of a greater or lesser diameter are accommodated. In the embodiment shown the shaped lugs 104 are each triangular in shape, it is envisaged that any tapered shape wherein the width of a leading side edge of a lug 104 relative to a trailing side edge of the lug 104 is relatively tapered i.e. has an incrementally increasing width, will achieve the same objective as that described. Referring now to FIGS. 4A and 4B the way in which the pitch P can be maintained regardless of the diameter of incoming articles B is shown.

In FIG. 4A the diameter of each article. B is D1. This diameter D1 is smaller than the diameter of an article B shown in FIG. 3. The first and second lug chain tables 96, 98 are movable and have been moved closer to the incoming stream 14 as denoted by directional arrows Z1. In this way, the triangular (tapered) lugs 104 of each of the first and second lug chains 92, 94 are disposed between adjacent articles of diameter D1 to a greater extent such that a wider portion $L_1$ of the lugs 104 determines the maximum spacing between each adjacent article B. As shown in FIG. 4A, the pitch P is calculated as: $P=D1+L_1$ where $L_1$ is the width of the triangular lug 104 at the widest portion thereof disposed between adjacent articles B. Likewise, and as shown in FIG. 4B, where articles B of a greater diameter D2 are accommodated the first and second lug chain tables 96, 98 are moved away from one another in the direction Z2 such that the lugs 104 intercept to a lesser extent and the widest portion $L_2$ of a lug 104 that is disposed between adjacent articles B is smaller than $L_1$ (i.e. $L_1 > L_2$). As such the pitch in the metering system of FIG. 4B is calculated as: $P=D2+L_2$ and therefore $D2+L_2=D1+L_1$ and the difference in diameter D1, D2 of the articles B is offset by the difference in the extent to which the triangular lug 104 separates adjacent articles B1, B2.

The regulator 86 therefore provides for quick and efficient adjustment in the event that the primary processing line outputs articles B of a different diameter to that previously being output. Articles B are therefore provided to the robotic divider 30 at regular positions as before and no problem is encountered when a tool head 40a of the robotic divider 30 is lowered in the loading section 42 to grasp an array of articles B. The first and second lug chain tables 96, 98 provide a frame work support or mount for the lugs and may take many different physical forms. The first and second lug chain tables 96, 98 are movable by means known in the art for example a screw thread between the working reaches of the two tables 96, 98 could bring those working reaches closer together or further apart; alternatively a jack type mechanism could be used to adjust the relative distance between the two tables. Whatever physical mechanism is used, it is preferable that an electronic and hence computer controllable drive means is used so that the movement of the supports 96, 98 is automated and accurately controllable.

Figure 5:
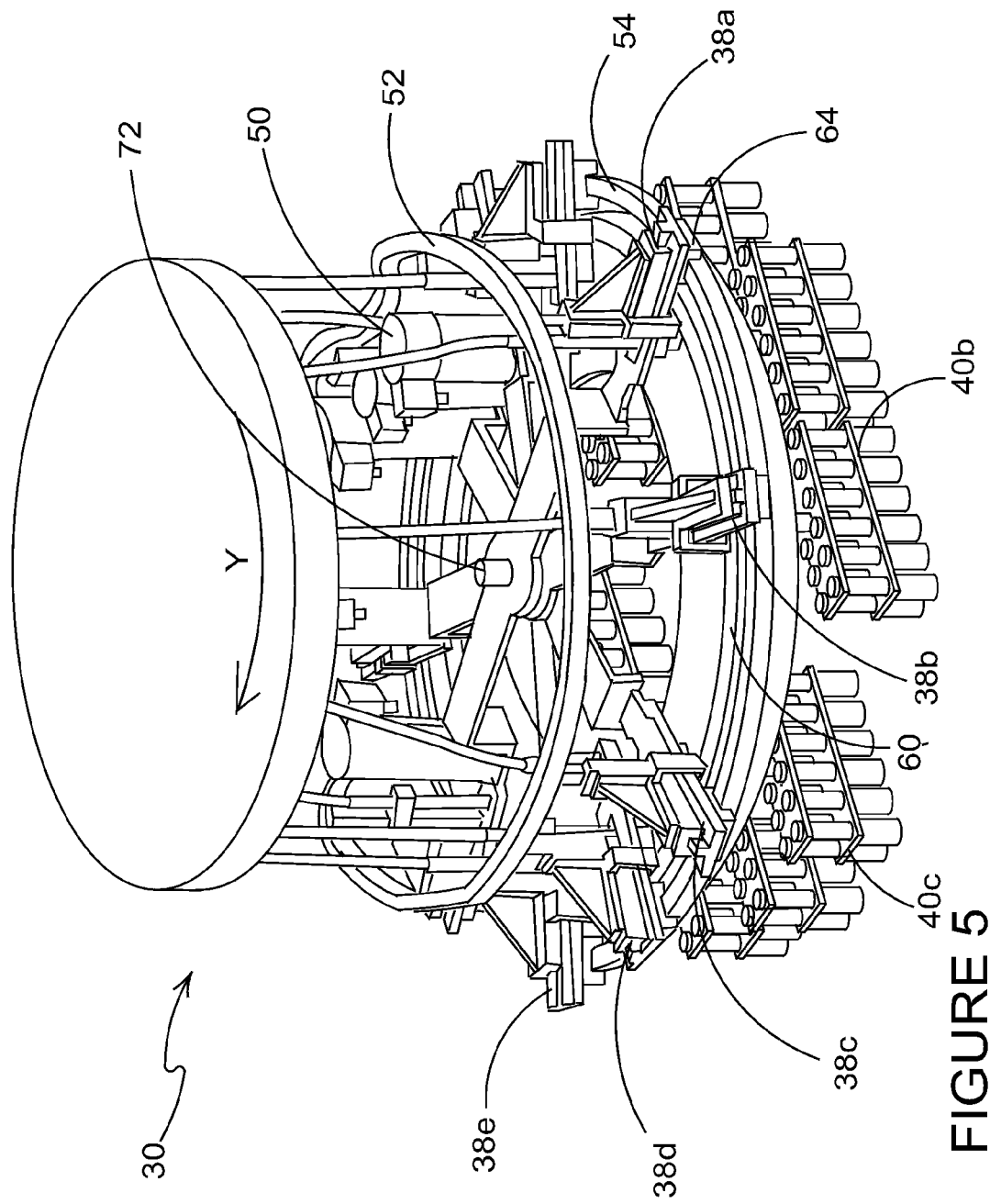
FIG. 5 shows a perspective view of a robotic divider.
Figure 6:
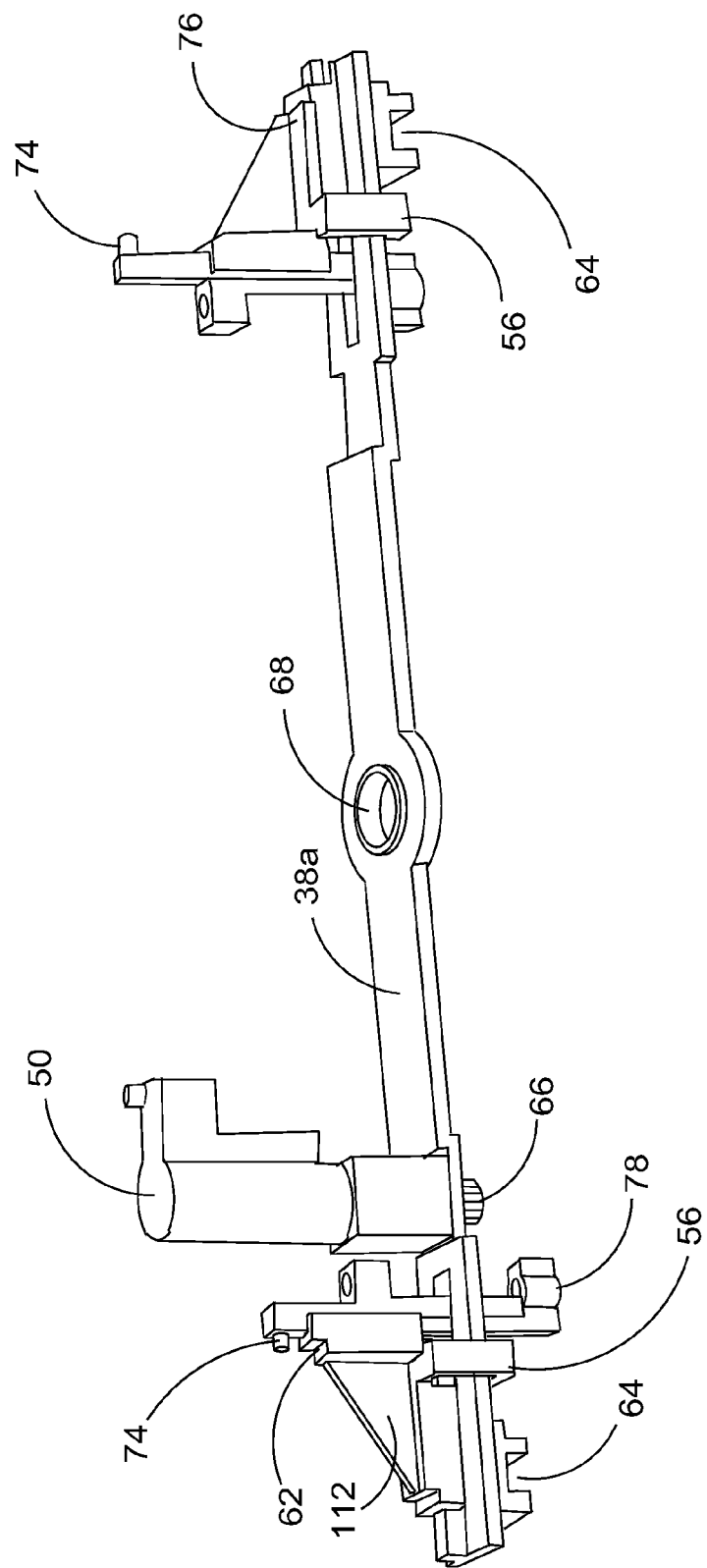
FIG. 6 shows a perspective view of an independent arm of the robotic divider of FIG. 5.
Figure 10:
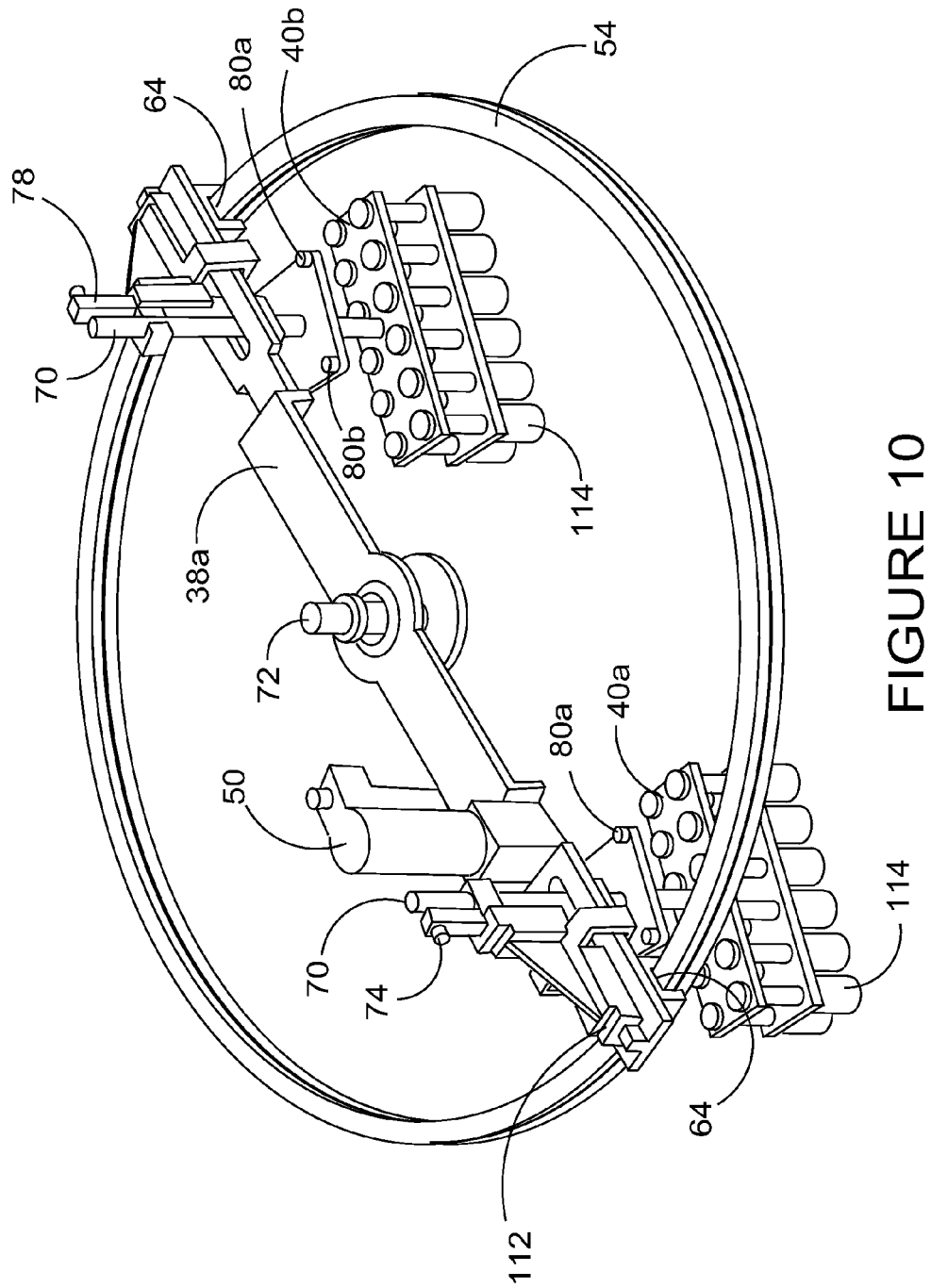
Figure 11:
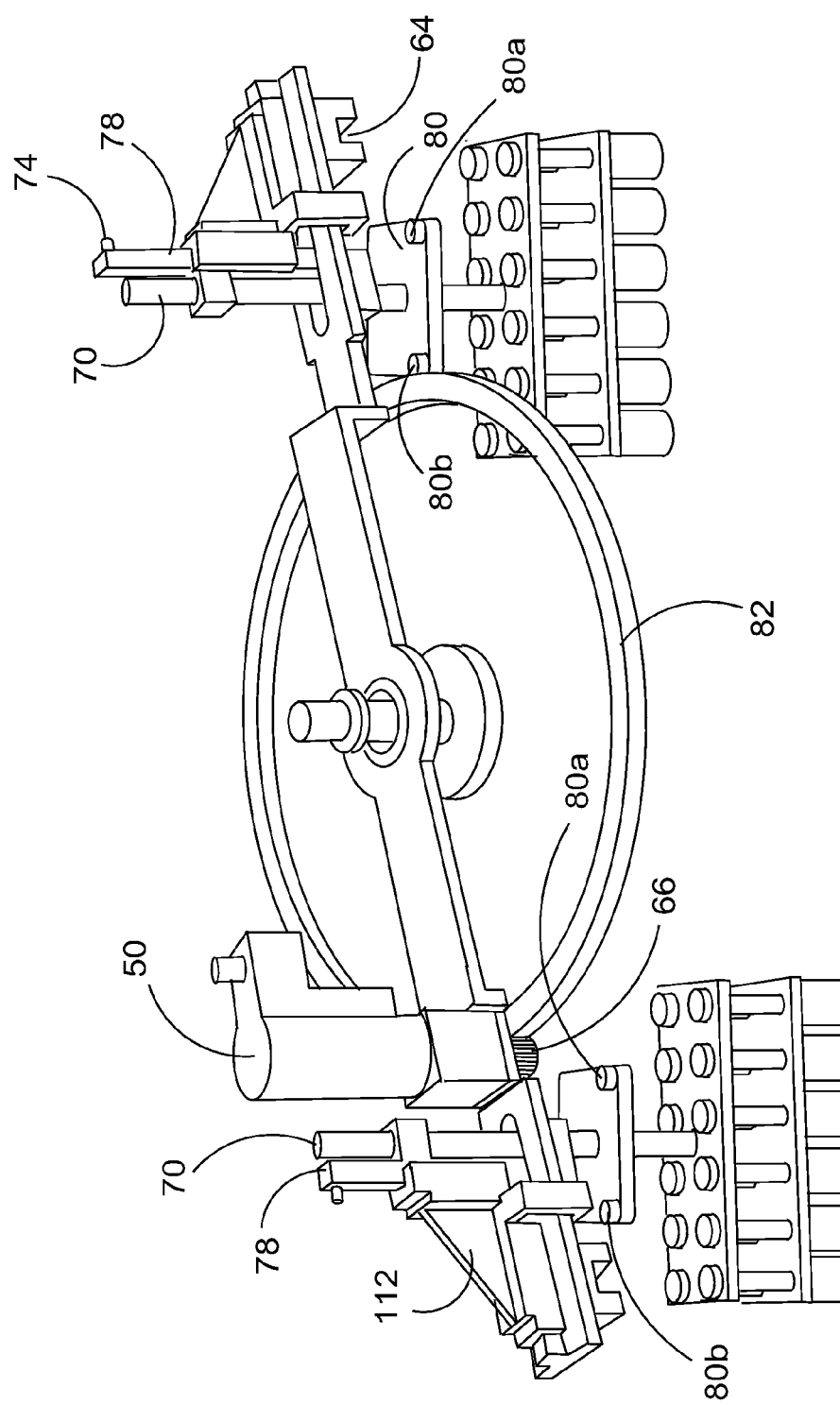

Turning now to FIGS. 5-13C, the specific construction of the robotic divider 30 of the exemplary embodiment is described. FIG. 5 shows a perspective front view of the robotic divider 30. The robotic divider 30 comprises five independent arms 38a, 38b, 38c, 38d and 38e, each being double ended and mounted about a central hub 68 onto an axle 72 (see FIG. 6). Each independent arm 38a-38e is double ended and is provided with a tool head 40a-40j (see FIG. 12) at each end thereof. Each independent arm 38a-38e is provided with its own drive means 50. In this embodiment each independent arm 38a-38e has a similar drive means, preferably a brushless electric motor 50 such as a servo motor. (It is envisaged that any suitable drive means can be used by way of further illustrative example, it is envisaged that a stepper motor or reluctance motor will provide an adequate drive means). The drive means 50, drives each independent arm in a rotary motion, in direction Y, about the central axle 72, guided by a circular guide 54 (refer to FIGS. 5 and 10). FIG. 11 shows a drive sprocket 66 coupled to the drive means 50 and to rotary cog 82. As the drive means rotates the drive sprocket 66, the independent arm 38*b* is rotated about rotary cog or rotary guide 82. To ensure steady rotary motion of the independent arm 38*b*, a circular guide 54 is provided. This is shown in FIG. 10, where circular cam path followers 64 (of the form of a bearing in a track), maintain each fixed end of the independent arm 38*a* on the circular cam path 54. Other suitable cam path and cam follower mechanisms can be used; the cam systems used in the example shown deploy parts (cam guide and followers) that are of the HCR construction, sold by THK (www.thk.de). The invention presents an advantageous cam system that provides for independent arms 38*a*-38*e* to be manipulated as described herein and the precise mechanism of achieving the controllable motion of tool heads, as provided by the robotic divider described is considered to be optional.

Since each of the five independent arms 38*a*-38*e* has its own drive means 50 affixed thereto the rotary velocity (angular velocity) and rate of acceleration of each independent arm 38*a*-38*e* around the circular cam path 54 is independently controllable. (Each drive means 50 therefore rotates about the central axle 72 with the independent arm 38*a*-*e* to which the drive means 50 is attached). Therefore at one position in the circular path 54 of the robotic divider 30, one independent arm 38*a* may be accelerating, at another position, one of the other independent arms 38*b* may be moving at constant velocity and another arm 38*c* may be decelerating. In this way the rotational velocity of each pair of tool heads 48*a*/48*f*, 48*b*/48*g*, 48*c*/48*h*, 48*d*/48*i* and 48*e*/48*j* is independently controllable.

The tool heads 40*a*-40*j* disposed at each end of the associated independent arm 38*a*-38*e* is movably coupled to the independent arm such that each tool head 40*a*-40*j* is movable in a vertical direction relative to the plane of the independent arm 38*a*-38*e* and in a horizontal direction toward and way from the central axle 72. In addition, each tool head 40*a*-40*j* is rotatatably moveable such that the orientation of each tool head 40*a*-40*j* is independently changeable. For example the long side of the tool head 40*a*-40*j* is positionable at any angle between 0 and 360 degrees relative to the independent arm 38.

To facilitate the movements described in the preceding paragraph, each tool head 40*a*-40*j* is slidably connected to a mount or vertical guide 78 by means of shaft 70, fixedly attached to the tool head 40*a*-40*j* and slidably coupled to the mount 78. Each tool head 40*a*-40*j* is slidably mounted to a second guide 112. The vertical guide 78 and second guide 112 are connected such that the vertical guide 78 is also moveable in a horizontal plane toward and away from the central axle 72. The second guide 112 is optionally mounted within a grove of the independent arm 38*a* which ensures that the movement of the second guide 112 and hence tool head 40*a*-40*j* toward and away from the central axle 72 is horizontal, i.e. radial relative to the central axle 72. (see FIG. 6).

Figure 7:
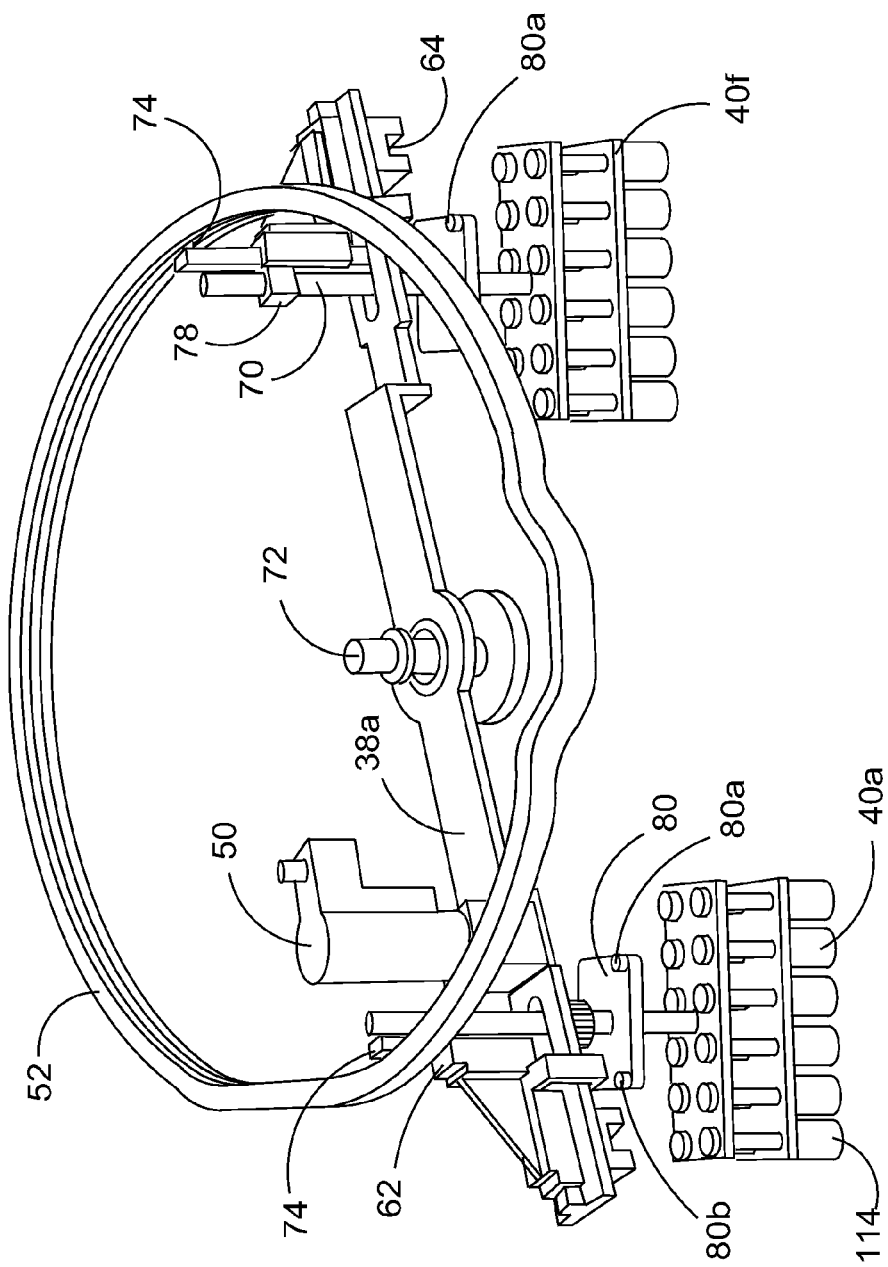
FIG. 7 shows a perspective view of the independent arm of FIG. 5 with tool heads coupled to either end thereof and a circular guide track.

Turning now to FIGS. 7 and 10, it will be seen that each tool head 40*a*-40*j* is provided with a mount 80. The mount 80 is fixedly attached to the shaft 70 such that if the mount 80 is caused to rotate, shaft 70 is caused to rotate and in turn the tool head 40*a* is thereby rotatable. Mount 80 is provided with two pairs of cam followers 80*a*/80*b* and 80*c*/80*d*. These orientation cam followers follow paths of upper and lower cam paths 52*b*/52*a* which controls the rotational movement of the tool heads 40*a*-40*j* as they each rotate about the central axle 72. This mechanism is shown in FIG. 9.

Components 74, 62 are provided on the vertical guide 78 and on the second guide 112 respectively to enable the tool head 40*a*-40*j* to follow a vertical cam path 52 (see FIGS. 5 and 7). The vertical cam path 52 is arranged such that in the region of the loading section 42 a tool head 40*a*-40*j* following that path is caused to descend at an angle to meet the group of articles B being assembled by the regulator 86 in the loading section 42. In this way each tool head 40*a*-40*j* is caused to descend upon a group of articles B and each of twelve gripping tools 114 locates an article of that group and grips that article B. Gripping tools 114 may be vacuum suction cups or other suitable releasable gripping components. As rotary motion of each independent arm 38*a*-38*e* continues, each tool head 40*a*-40*j*, following the vertical cam path 52 and trajectory path 58, moves towards the second conveyor 88. The second conveyor 88 preferably comprises a series of lane dividers 116 disposed substantially perpendicularly relative to a base of the second conveyor 88. As the second (endless) conveyor 88 rotates, the lane dividers 116 are brought into an upstanding position. In order for the tool head 40*a* and grasped article group to clear the lane dividers 116 the vertical cam path 52 has a short ascending portion. The article group, as grasped by the tool head, thereby clears the lane dividers 116 and then almost immediately the article group is lowered by means of the vertical cam path 52 having a descending section length. The article group is aligned with the lane dividers such that a front row of six articles B is aligned with a leading lane and a back row of six articles B is aligned with a trailing lane. This motion and alignment is further described with reference to FIGS. 13A-13C. Once aligned the tool heads 40*a*-40*j* release the article group and then follow an ascending portion of the vertical cam path 52 to lift the tool head 40*a*-40*j* away from the article group. Each tool head 40*a*-40*j* continues through the cycle following the same vertical cam path 52, each successively collecting and delivering a group of articles B from the input stream 14 to the second conveyor 88.

Figure 8:
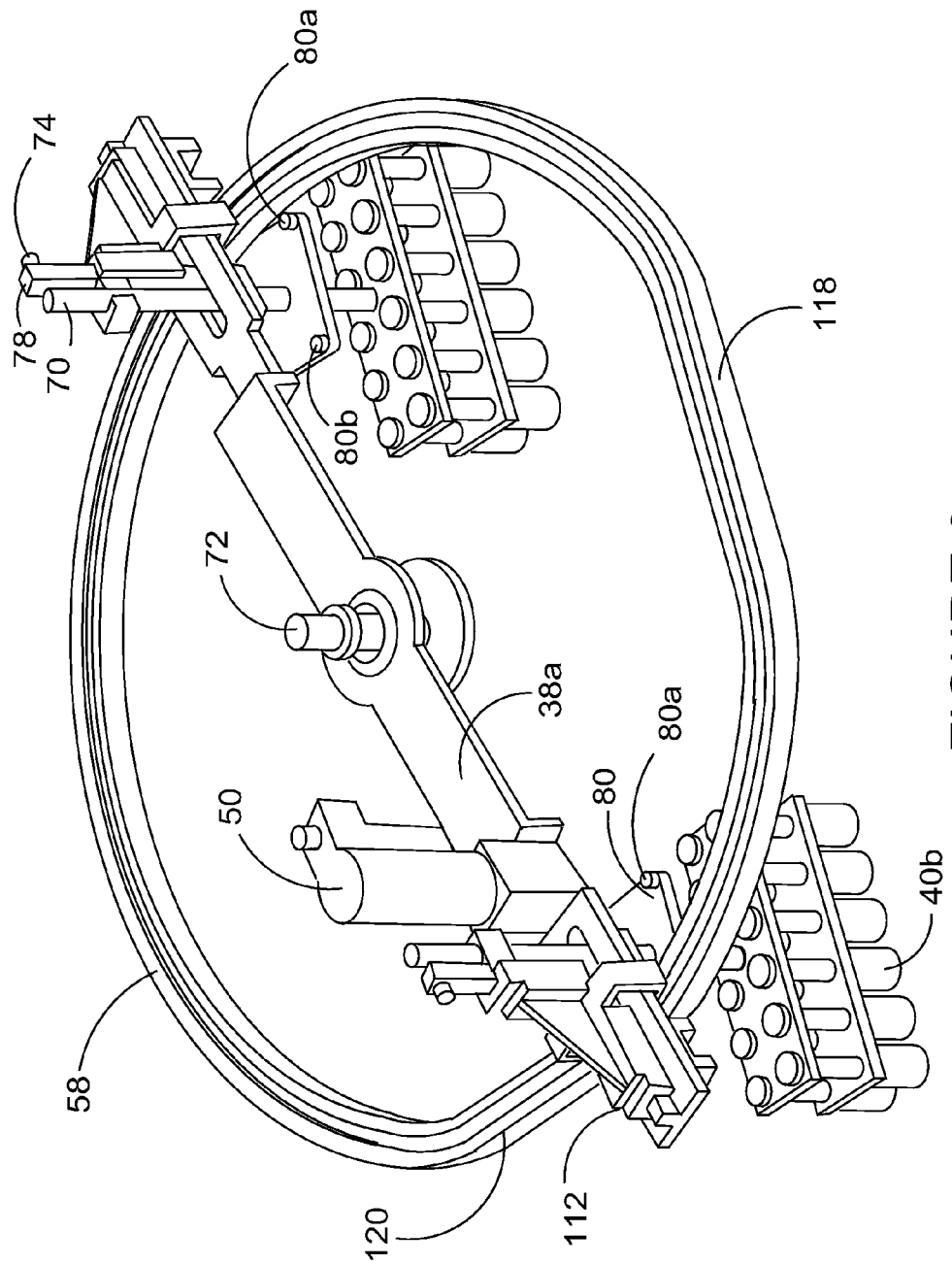
FIG. 8 shows a perspective schematic view of a double ended independent arm with tool heads mounted at either end thereof following a trajectory cam.

Referring now to FIG. 8 there is shown a trajectory cam 58 upon which the second guide 112 is mounted. The second guide 112 follows the trajectory cam path 58 by means of trajectory cam followers 76, 56 coupled to the second guide 112 being disposed in contact with the trajectory cam path 58. The trajectory cam path 58 is circular with the exception of two linear portions. The first linear portion 118 is disposed substantially parallel to the incoming stream of articles 14 and the second, a shorter, linear portion, 120 is disposed substantially parallel to the second conveyor 88. As each independent arm 38*a*-38*e* is rotated by its drive means 50 around the circular guide 54, each tool head 40*a*-40*j*, is conveyed around the trajectory cam 58 to the first linear portion 118 where each tool head 40*a*-40*j* (successively) is maintained in parallel relationship with the incoming stream of metered articles B in the loading section 42; around a curved corner to circumnavigate the angle between the first conveyor 90 and second conveyor 88; and then along second linear portion 120 where each tool head 40*a*-40*j* is maintained in parallel relationship with the second conveyer 88 in the unloading section 44. During the linear portions 118, 120 of the trajectory cam path 58, the tool head 40*a*-40*j* is simultaneously raised and lowered as determined by the aforedescribed vertical cam path 52. In this way the position of the tool head 40*a*-40*j* is controlled in 3-dimensions for successive collection and delivery of groups of articles B.

Whilst each tool head 40*a*-40*j* follows the vertical cam path 52 and the trajectory cam path 58, an orientation cam system 52a/52b is also followed. The orientation cam system 52a/52b comprises an upper cam path 52a disposed in vertical alignment with and atop a lower cam path 52a. The upper and lower orientation cam paths 52b, 52a are illustrated in FIGS. 9A and 9B in plan view and in side by side relationship so that the course of each cam path can be seen.

Figure 12:
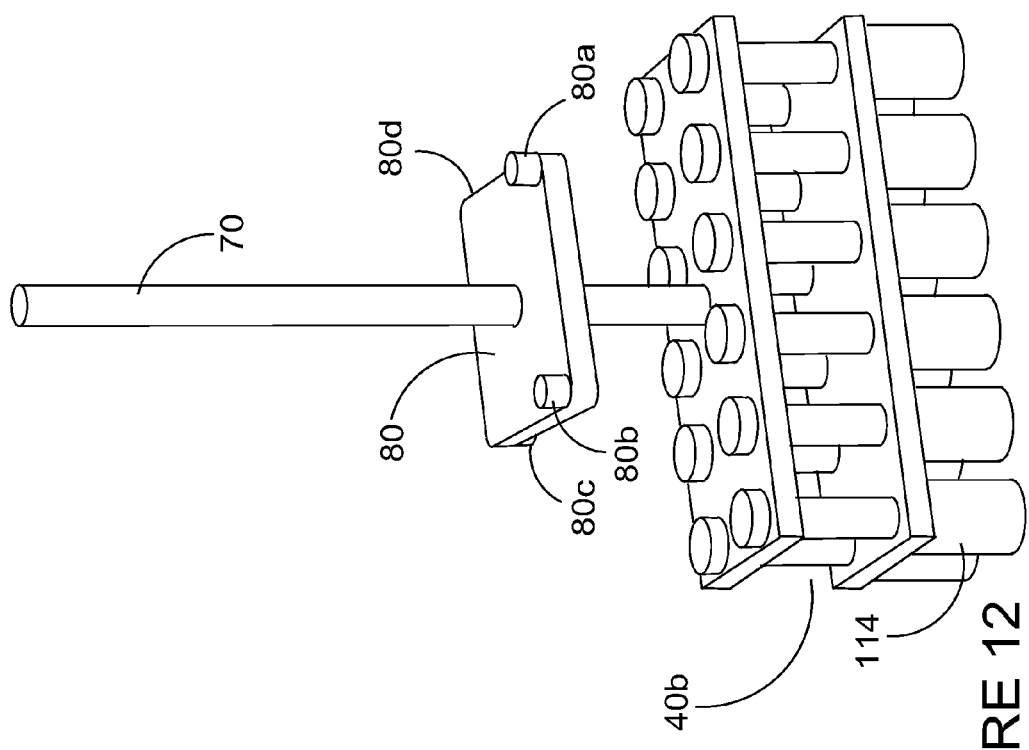

Fixedly attached to the shaft 70, is a mount 80. This is shown in FIG. 12 and FIGS. 9A, 9B. Each mount 80 comprises a pair of upper cam followers 80a and 80b (optionally formed as low-friction rollers). Each mount 80 also comprises a pair of lower cam followers 80c and 80d (also optionally formed as low-friction rollers). The mount 80 is substantially rectangular (though it is envisaged that other shaped structures would be suitable for achieving the following function). The upper cam followers 80a, 80b, are disposed on the same, upper first side of the mount 80 and the pair of lower cam followers 80c and 80d are disposed on a diagonally opposite lower, second side of the mount 80. This arrangement is best depicted in FIG. 12 (cam follower 80d is obscured from view). The four orientation cam followers 80a-80d follow the upper and lower cam paths 52b/52a of the orientation cam path (see FIGS. 9A, 9B). The pair of upper cam followers 80a and 80b follow the upper orientation cam path 52b and likewise, the pair of lower orientation cam followers 80c and 80d follow the lower orientation cam path 52a. The upper and lower orientation cam paths 52b and 52a are shaped such that each tool head 40a-40j is rotated as it orbits the axle 72 such that each tool head 40a-40j is maintained with a longer edge of the tool head in a substantially parallel relationship relative to the incoming stream of metered articles. This specific orientation is optional and is preferred where the incoming conveyor 90 and second conveyor 88 are disposed substantially perpendicularly relative to one another. In embodiments where the second conveyor 88 is disposed at an alternative angle, then the orientation cam paths 52a, 52b will have an alternative structure such that rotation of the mount 80 and as a result rotation of the tool heads 40a-40j is facilitated between the collecting and delivery of a group of articles B. In this way the article group deposited in the unloading section 44 can be oriented in parallel with lane dividers 116 of the second conveyor 88 to ensure alignment of each lane of six articles B of the deposited group with lanes of the second conveyor irrespective of the angle between the incoming conveyor 90 and second conveyor 88.

The rotational position of the mount 80 as controlled by the upper cam followers 80a, 80b following the course set by the upper cam path 52b which is shown in plan view in FIG. 9A; likewise, the rotational position of the mount 80 is also (and for the most part simultaneously) controlled by the lower cam followers 80c, 80d following the course set by the lower cam path 52b which is shown in plan view in FIG. 9B. Mounts 80 are depicted at a number of positions during the cycle of the upper and lower cam paths 52b, 52a. The mounts 80 illustrate a cycle of one mount and do not correspond to respective positions of the mounts 80 connected to each of the shafts 78 coupled to each of the tool heads 40a-40j. It will be seen from the figures that the upper cam path 52b has two linear portions 118a, 120a. During the cycle around the robotic divider 30, as each tool head 40a-40j reaches the position adjacent one of the first and second conveyors 90, 88, each tool head 40a-40j is required to maintain a parallel orientation relative to the conveyor 90, 88. However, each tool head 40a-40j is also required to move in a vertical direction (as determined by the vertical cam path 58 described above). The vertical cam path 58 takes precedence during the periods at 118a, 120a, and the mount 80 is lowered away from the upper cam path 52b. To facilitate this, the lower cam path is discontinued at these positions and does not prevent the mount 80 from being lowered beneath the plane of the lower cam path 52a. In order to ensure that mount 80 does not rotate as it is lowered (and then subsequently raised, the upper cam path 52b is provided with an extension (not shown), in the regions of 118a, 120a. The extension takes the form of a plate connected perpendicularly relative to the plane of the upper cam path 52b such that contact between the side of mount 80 and this extension plate restricts the mount 80 from rotation and in this way, the upper orientation cam 52b controls movement of the mount 80 in three dimensions; the x-y plane (i.e. the plane shown in the plan view of the upper orientation cam path 52b) of the upper orientation cam and a z-axis running (out of the plane of the paper of FIG. 9a) i.e. between the upper orientation cam 52b and the lower orientation cam 52a shown in FIG. 5.

Figure 14A:
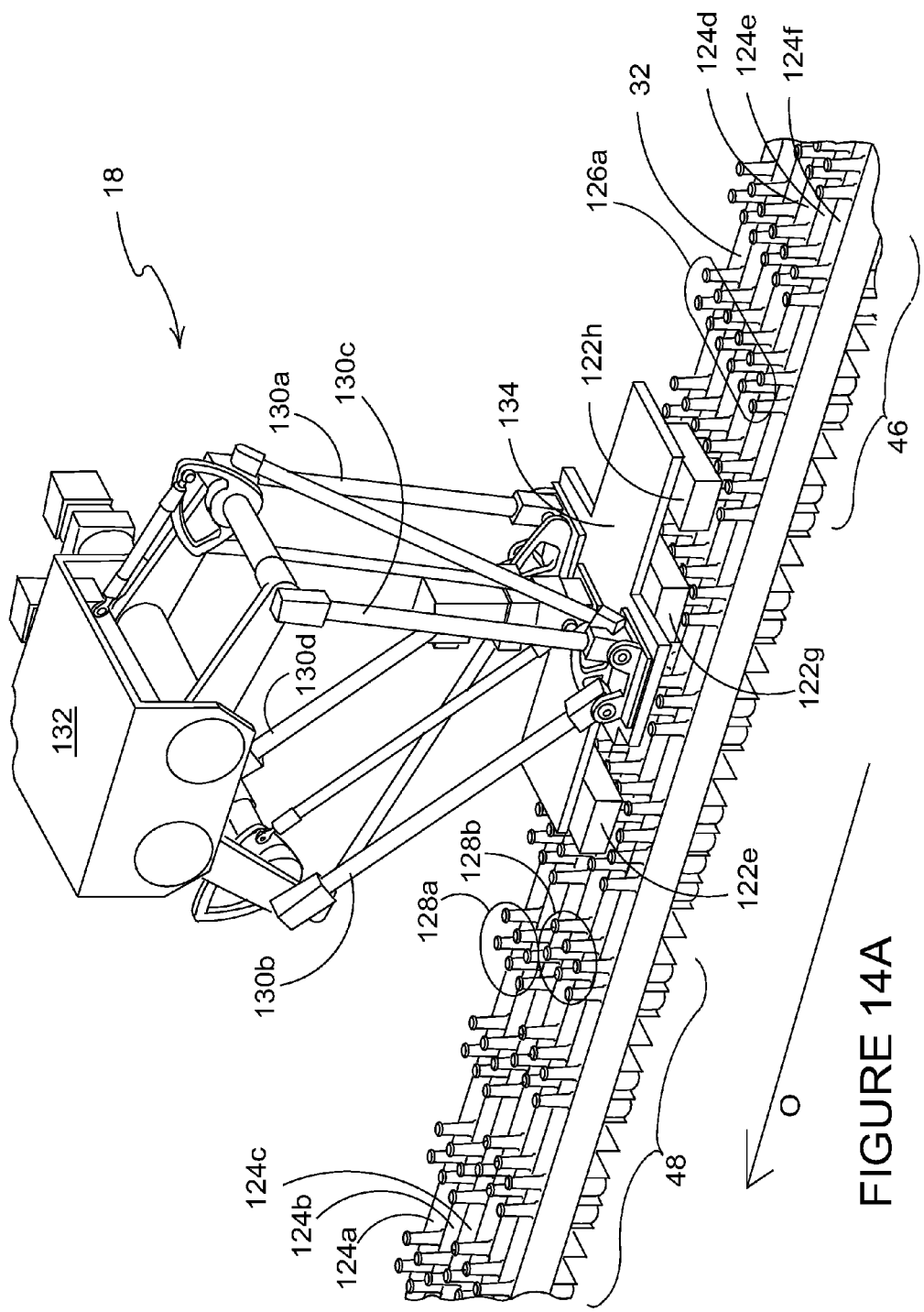
FIG. 14A is a perspective illustration from the top of a rearranging mechanism in a first mode of operation.
Figure 14B:
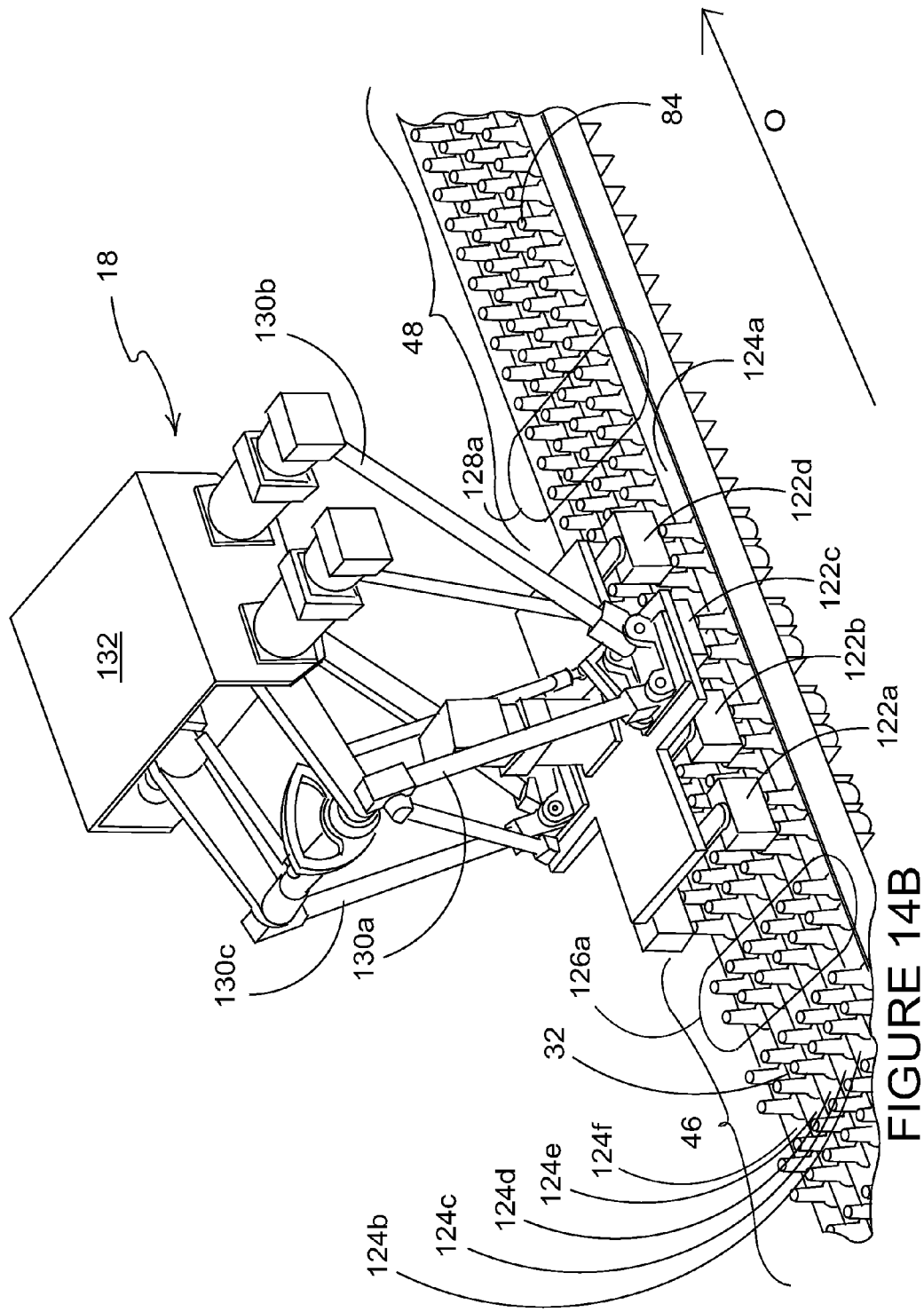
FIG. 14B is a perspective illustration from the top of a rearranging mechanism in a second mode of operation.
Figure 14C:
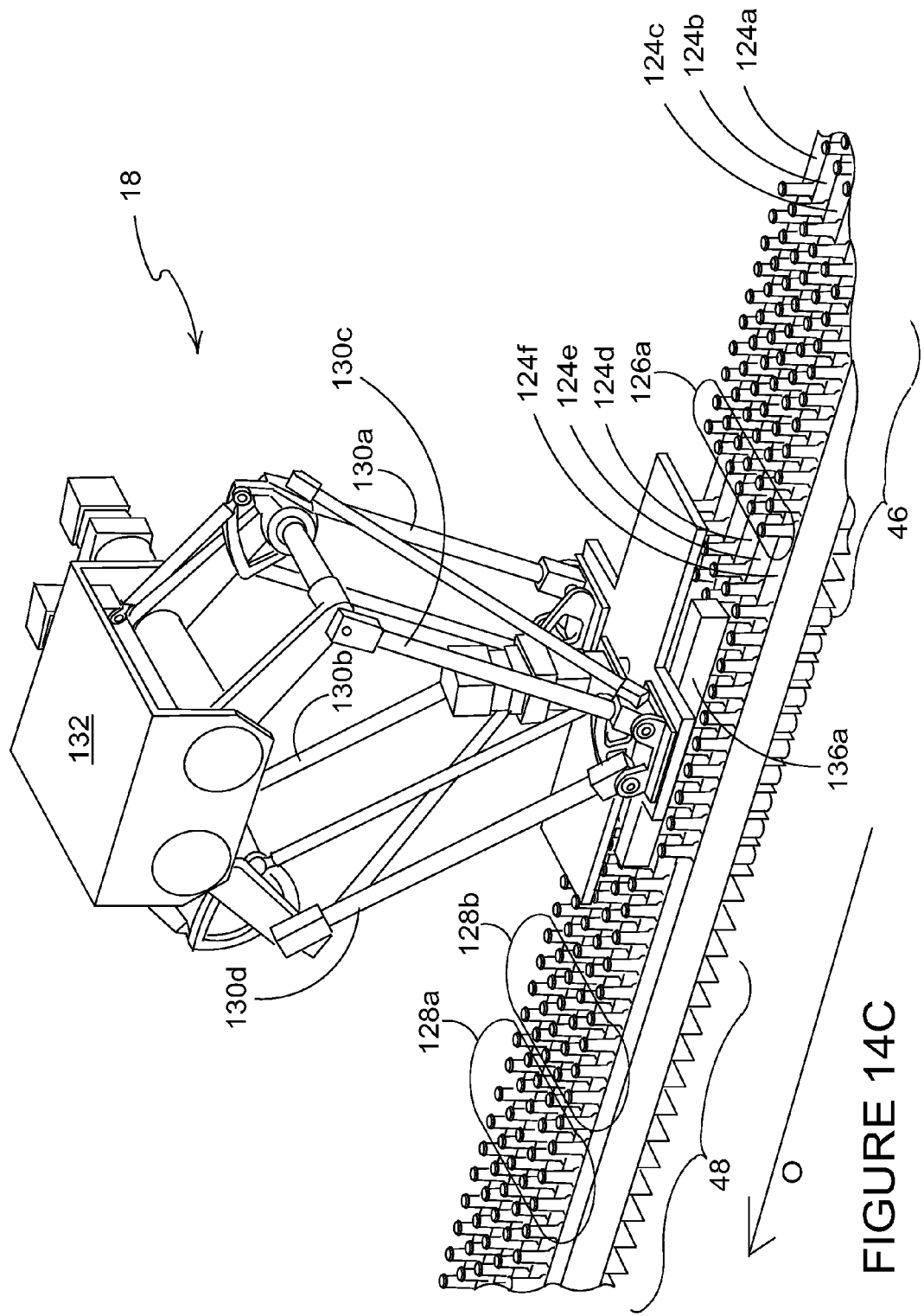
FIG. 14C is a perspective illustration from the top of a rearranging mechanism in a third mode of operation.

The rotational position of each tool head 40a-40j during a cycle of the robotic divider 30 is illustrated in FIGS. 13A-13C. Each FIG. 13A-13C shows a schematic snap shot in time of the robotic divider 30. Each FIG. 13A-13C illustrates a snap shot taken at a similar time in a cycle of the robotic divider, but in each FIG. 13A-13C, a different mode of operation is shown. The mode of operation is determined by the required configuration of grouped articles to be output, at rearrangement section 48, in output stream 84. In each mode of operation the robotic divider 30 takes a full group of articles in a 2×6 configuration from the metered incoming stream and moves the group to the second conveyor 88. Depending upon the configuration of grouped articles to be created by the rearranging mechanism 18 (which is in turn determined by the requirements of the further processing machine 22, 24), each independent arm 38a-38e will be rotated from the loading section 42 to the unloading section 44 at a predetermined average velocity, such that when a tool head 40a-40j reaches the unloading section, the deposit of the group of twelve articles will be timed relative to the movement of the second conveyor 88 such that the spacing between the immediately succeeding group deposited and the present group being deposited is controlled. Additionally, the linear speed of the tool head 40a-40j as the article group is unloaded is controlled to match the linear speed of the second conveyor 88 in order to ensure smooth unloading. In one exemplary mode of operation it is required for the rearranging mechanism 18, (disposed downstream of the robotic divider 30) to group articles into 2×3 arrays (this rearrangement is shown in FIG. 14A). To do this, the rearranging mechanism 18 requires each group of 2×6 articles to be spaced by two lane dividers 116. In FIG. 13A it can be seen that the deposit of a 2×6 array of articles B by heads 40b, 40c and 40d has been timed relative to the linear speed of the second conveyor 88 such that each group of 6×2 is spaced two lanes apart from the next group.

By rotating each independent arm 38a-38e at an appropriate angular velocity relative to the second conveyor 88 the position at which successive groups of articles are deposited onto the second conveyor 88 is controllable. In some instances it may be required that after loading the tool head 40a, in order to unload that tool head 40a-40j at the right pitch in terms of the second conveyor 88, acceleration of that tool head is required. The angular velocity of the tool head 40a is therefore increased between the loading and unloading section and adjusted as the head 40a reaches the unloading section such that a linear component (parallel to the second conveyor 88) of the angular velocity of the tool head 40a matches the linear speed of the second conveyor. Because each independent arm 38a-38e has its own controllable drive means 50, such independent acceleration (and indeed deceleration) is achieved. The specific angular velocity and rate of acceleration/deceleration of each independent arm 38a-38e throughout a cycle is preprogrammed into a logic controller coupled to the drive means 50. The program selected for controlling each drive means 50 depends upon the mode of operation of the robotic divider 30. Each drive means 50 whilst independently controllable preferably is coupled to a common control means (such as a computer) such that only selection of a mode of operation on the common control means is required to change the mode of operation of each drive means 50. In addition, in this way operation of each independent drive means 50 is synchronized. It will be understood that simultaneous and synchronized operation of each drive means 50 is required.

The robotic divider 30 is operable to deliver a tool head 40a-40j alongside the incoming metered stream at a first angular velocity $\omega_1$ having a linear component $V_1$ (parallel to that stream) that matches the linear speed $V_1$ of conveyance of that stream. In this way collection of a 2×6 group of articles can be smoothly effected. Movement of the tool head 40a-40j (by controlling the rotation of the independent arm 38a) toward the second conveyor 88 is controlled at an average angular velocity $\omega_{a1}$. The average angular velocity $\omega_{a1}$ is controlled such that arrival of the tool head is timed in terms of relative position with the transverse lanes of the second conveyor 88. Additionally, the average angular velocity $\omega_{a1}$ is controlled such that the angular velocity $\omega_2$ of the tool head 40a, when the tool head reaches the second conveyor 88, has a linear component $V_2$ (parallel to the second conveyor 88) that matches the linear speed $V_2$ of the second conveyor 88. Smooth delivery of that group of articles B to the second conveyor 88 is thereby affected. Preferably, the linear components of angular velocities $\omega_1$ and $\omega_2$ are equal, however, the robotic divider 30 is controllable to match the linear component of the angular velocity $\omega_2$ with the linear speed $V_2$ of the second conveyor 88 irrespective of whether $V_1=V_2$; $V_1>V_2$; or $V_1<V_2$. The other independent arms 30a-30e are not affected by a change in speed of one of the other arms, and because of the number of arms, no single independent arm is effecting loading and unloading at the same time. (It is envisaged that, in other embodiments of the robotic divider 30, the unused tool head 40f at the opposite end of independent arm 38a relative to tool head 40a, is used simultaneously to tool head 40a. In such an embodiment a second pair of incoming and outgoing conveyors, preferably at a lower or greater height than the incoming and second conveyors 88 of the embodiment illustrated, are serviced simultaneously and preferably in a synchronized manner to the servicing of the incoming and second conveyors 88 of the embodiment illustrated.)

FIG. 14A illustrates the second stream 32 of articles in the unloading section 46 wherein, each 2×6 group is spaced by two pitches from the immediately succeeding or preceding group. Each 2×6 group is indicated by 126a. The second conveyor 88 (not entirely shown in FIG. 14A) optionally comprises longitudinal lane dividers as well as the transverse lane dividers 116. As such the articles B are retained in a grid-type conveyor having a first lane 124a; second lane 124b; third lane 124c; fourth lane 124d; fifth lane 124e and sixth lane 124f. The rearranging mechanism 18 is disposed above the stream of articles 32 (preferably coupled to an overhead line) that contains six lanes of articles B. The rearranging robot 18 comprises a controller 132 which drives hinged arms 130a, 130b, 130c and 130d. The rearranging robot 18 also comprises a platform 134 coupled to which are four rearranging mechanism tool heads 122e-122h. Each rearranging mechanism tool head 122e-122h is, in this mode of operation capable of lifting and depositing a group of articles in a 2×3 array. The controller 132 of the rearranging mechanism 18 operates the four tool heads 122e-122h such that each tool head 122e-122h simultaneously lifts a group of 2×3 articles from each of four adjacent incoming groups 126a. The hinged anus 130a-130d are coupled to the platform 134 and/or one of the tool heads 122f, 122g. The hinged arms 130a-130d are driven and controlled by the controller 132 such that they descend onto four incoming groups 126a as the incoming groups 126a are conveyed in the direction 'O'. In order to follow the moving incoming groups 126a while the groups are engaged and lifted vertically out of the grid type conveyor, the hinged arms 130a-130d and hence tool heads 122e-122h move in the direction 'O' at a linear speed matching that of the grid-type conveyor 88. The grouped articles are lifted upwardly a sufficient height to clear the lane dividers 116 and longitudinal lane dividers. As the four sets of grouped articles are each lifted the hinged arms 130a-130d momentarily stop or at least slow relative to the moving conveyor 88 such that a lane space succeeding each lifted group is conveyed into vertical alignment with each lifted group. The hinged arms 130a-130d are lowered such that the tool heads 122e-122h are lowered and the lifted groups deposited in the aforementioned lane spaces. To increase the rate at which the lifted articles are deposited, the hinged arms 130a-130d (and hence tool heads 122e-122h) preferably move in a direction opposite to direction 'O' and in this way the lifted group meets the lane space more quickly. Once the four groups have been deposited it can be seen, in rearrangement section 48 of FIG. 14A, that eight outgoing groups 128a, 128b each of a 2×3 configuration are created. The cycle of the rearranging mechanism 18 is repeated. First the rearranging mechanism must be repositioned. To achieve this, the rearranging mechanism 18 moves the tool heads 122e-122h further upstream of the second stream 32 in the opposite direction to 'O' until the most upstream tool head 122h is aligned with a fourth incoming group of a set of four incoming groups 126a. At the same time, the most downstream tool head 122e is moved toward the first incoming group of that set. i.e. the most downstream tool head 122e moves into a position replacing the most upstream tool head 122h and the most upstream tool head moves further upstream to become aligned with a fourth incoming group 126a of a set of four. In effect the platform 134 and tool heads 122e-h move upstream of the second conveyor 88 a distance equivalent to 12 longitudinal lanes of the second conveyor 88. The platform 134 does not move the entire distance because the second conveyor 88 is moving towards the platform 134 in the direction 'O' at the same time as the platform 134 of rearranging mechanism 18 is moving upstream in the reverse direction to direction 'O'. The rearrangement cycle is repeated and four more incoming groups 126a are acted upon by the rearranging mechanism 18 to create eight more groups of 6 articles each in a 2×3 configuration. The rearranging mechanism 18 therefore is an apparatus for rearranging N adjacent metered lanes of articles into arrays or groups of articles configured m×N' wherein N'=any number of articles between 1 and N and wherein m preferably is between 1 and 10.

Returning to consider a second mode of operation of the divider robot 30 illustrated in FIG. 13B. It can be seen that the movement of each independent arm 38a-38e of the robotic divider 30 is controlled such that groups of 6×2 articles are deposited upon the second conveyor 88 with only one transverse lane spacing between immediately successive groups. If the conveyor 88 is moved at the same linear speed as the second conveyor 88 in the first mode of operation shown in 13A then to achieve a lesser spacing (one lane not two compared to the first mode) then in the second mode of operation, each independent arm 38a-38e is moved between the loading section 42 and unloading section 44 at an average angular velocity $\omega_{a2}$ that is greater than the average velocity $\omega_{a1}$ of each independent arm 38a-38e during the first mode of operation. It will be understood that the timing of the delivery of article groups from the incoming metered stream to the second conveyor 88 such that a single transverse lane spacing is achieved in the second metering section 46, is effected also by the linear speed of the incoming and second conveyors 90, 88.

In the second mode of operation the single transverse lane spacing between immediately adjacent incoming groups 126a of articles B in the second metering section 46 facilitates rearrangement of the 2×6 incoming article groups 126a into outgoing articles groups 128a in a 3×4 configuration in the rearrangement section 48. The rearranging mechanism 18 utilizes eight tool heads 122a-122h, each for collecting and moving two articles. The tool heads 122a-122d are disposed on one side of the rearranging mechanism 18 and the tool heads 122e-122h are disposed on the other side of the rearranging mechanism 18 (see FIG. 14B). In this way, tool heads 122a-122d lift two articles each from the first longitudinal lane 124a and each tool head 122e-h lifts two articles from the sixth lane 124f. The tool heads 122a-122h are each coupled to the platform 134 by a rotating arm 138 that is rotatably moveable with respect to the platform 134 such that each tool head 122a-122h can be moved from a position in which it is substantially parallel to each longitudinal lane 124a-124f to a position in which it is substantially perpendicular thereto. Additionally the length of each rotating arm 138 is sized such that when opposed tool heads 122a, 122h are each rotated (substantially 90 degrees), the tool heads 122a and 122h become disposed in side by side relationship disposed in vertical alignment with the second and third lanes 124b, 124c and fourth and fifth lanes 124d and 124e respectively. The hinged arms 130a-130d of the rearranging mechanism 18 are then extended (by straightening of the hinged connection) to lower the tool heads 122a and 122h for depositing the articles in the respective second 124b, third 124c, fourth 124d and fifth 124e lanes. Similarly rotating arms coupled to each of the other rearranging mechanism tool heads 122b, 122c, 122d, 122g, 122f, 122e facilitate similar movement of these rearranging mechanism tool heads 122b, 122c, 122d, 122g, 122f, 122e to that described above. In this way each single transverse lane space between the four adjacent groups of the incoming 126a (2×6) groups has four articles B deposited in the second to fifth longitudinal lanes 124b, 124c, 124d and 124e. The first and sixth longitudinal lanes are emptied and the stream of organized and metered articles 84 contains transverse lanes or rows which are four articles wide. The rearrangement of two-article wide incoming stream 14 has been effected by using a robotic divider 30 creating six article wide spaced lanes and subsequent rearrangement by the rearranging mechanism 18. The outgoing stream of organized and metered articles 84 is transferred to the further processing unit 22, where packaging of articles in any configuration that is 4 articles wide (i.e. 4×1; 4×2; 4×3 etc.) is readily achieved.

Finally, a third exemplary mode of operation, of the robotic divider 30 is illustrated with reference to FIG. 13C. In the third mode of operation, the creation of a six article wide stream is achieved in the same way as before described albeit there is no transverse lane spacing between immediately successively deposited groups of 2×6 articles B until five such groups have been deposited. At this point the robotic divider 30 controls the independent arms 38a-38e such that two transverse lanes are left without articles. Further rearrangement of the incoming groups of 10×6 articles is then performed by the rearranging mechanism wherein a second tool head 136a having two parts each part capable of simultaneously lifting 5 articles B is utilized to lift 10 articles from the sixth longitudinal lane 124f and manipulate the articles (by movement of the platform 134 and or hinged arms 130a-130d and/or rotatable connection between the second tool head 136a and the platform 134) such that an article B is deposited into each of the first lane 124a; second lane 124b, third lane 124c, fourth lane 124d and fifth lane 124e of each of the two transverse spacer lanes. The result is that incoming stream 14 of two articles B wide has been rearranged by the robotic divider 30 taking groups of twelve articles at a time and by the rearranging mechanism 18 to form a continuous output stream 84 of articles B that is five articles B wide and wherein the articles are metered relative to one another. FIG. 14 C illustrates the rearranging section and it can be seen that if required the output stream 84 is collated into outgoing groups 128a, 128b of a 5×3 configuration. Readily it will be appreciated that, that 5 article B wide outgoing stream 84 can facilitate assembly of packages containing any configuration that is 5 articles wide (i.e. 5×1; 5×2; 5×3 and so on). The illustration of groups in a 5×3 configuration is exemplary and in no way should be interpreted as limiting.

Figure 14D:
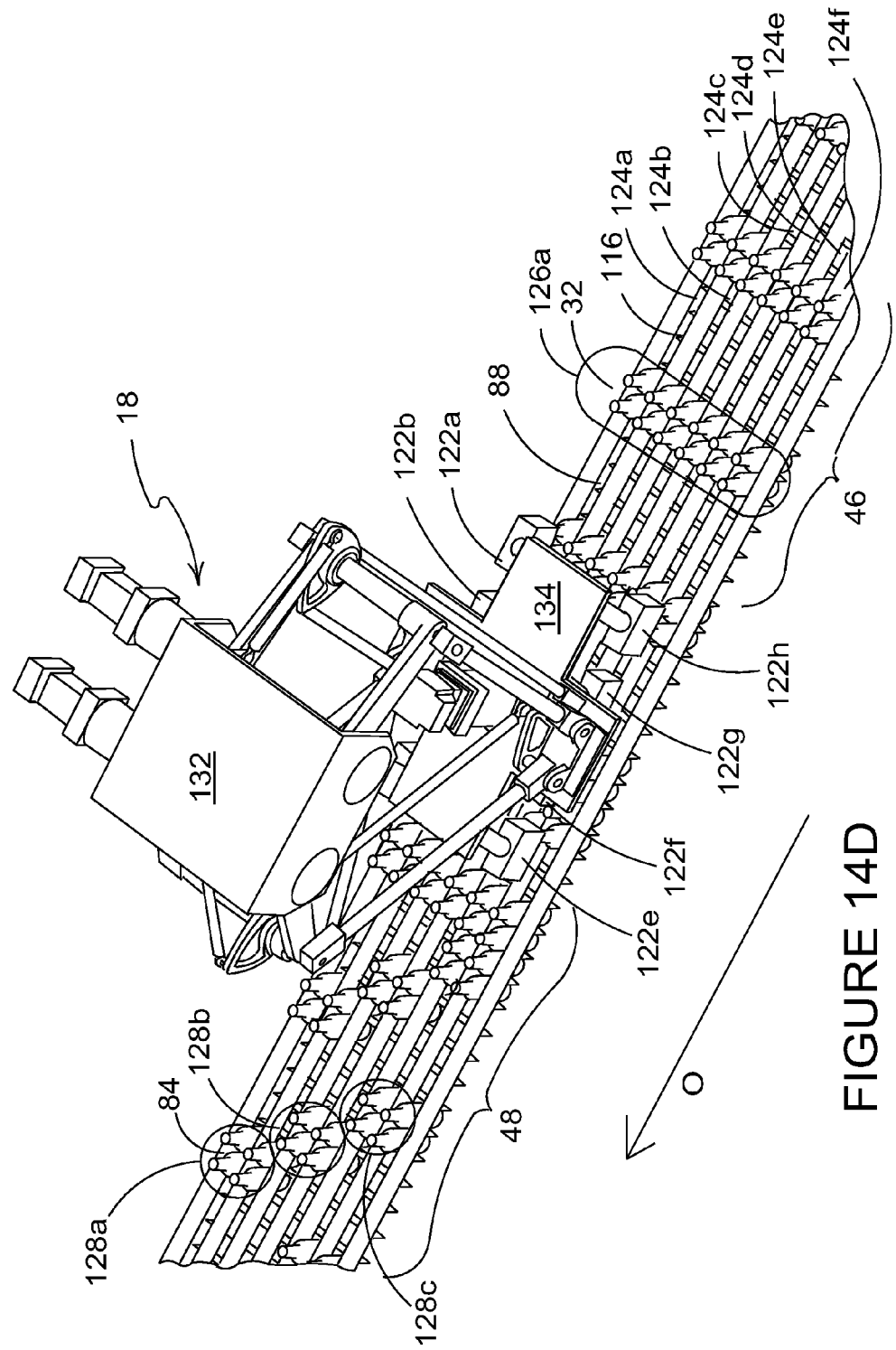
FIG. 14D is a perspective illustration from the top of a rearranging mechanism in a fourth mode of operation.

In a fourth exemplary mode of operation of the rearranging mechanism shown in FIG. 14D, the incoming groups 126a of 2×6 articles B are spaced by four transverse lanes and the rearranging mechanism 18 utilises tool heads capable of lifting four articles B at a time, one centrally disposed tool head aligned with third and fourth lanes 124c, 124d and another tool head aligned with fifth and sixth lanes 124e, 124f, to move four articles out of an incoming group 126a into the first two transverse lane spaces and last two transverse lane spaces. In this way three outgoing groups 128a, 128b, 128c each of a 2×2 configuration are formed.

In a further exemplary mode of operation, wherein the rearranging robot mechanism 18 is not provided, an article group of a 2×6 array, held by a leading tool head 40b are placed onto the second conveyor 88 between transverse lane dividers 116. No longitudinal lane dividers are included. Then, the immediately succeeding tool head 40a places the 2×6 array of articles that it is holding either side of the next transverse lane divider 116. Operation repeats with a full 2×6 array and a further half of a 2×6 array (in other words, a 1×6 array), being placed together between transverse lane dividers 116. In this way, articles are grouped in the second conveyor in a 3×6 arrangement. The second conveyor 88 preferably travels at a speed slightly slower than the transverse lugs 116 so that the 2×6 array and 1×6 array are brought together as a unitary group by means of the succeeding articles (in this case the 1×6 array) being conveyed by the transverse lug 116 catching up with the leading 2×6 array. As the next 3×6 array is formed, it is the 1×6 array that leads, but this group is conveyed by the slower speed second conveyor 90 whereas the trailing 2×6 array is conveyed by the slightly faster transverse lug so that the 2×6 group "catches up" with the leading 1×6 group to form a unitary 3×6 array.

It will be understood that this mode of operation can be varied such that the delivery of a selected 2×6 array (or other sized array) is timed with the speed of the second conveyor 88 and upstanding transverse lane dividers 116 to create groups of other divisions, for example, a 5×6 or 5×4 array of articles.

In a further variation of the illustrated embodiment, one or each tool head or element 40a-40j may be formed with splittable heads or comprised of two separable and relatively moveable heads or the vacuum cup pick up tools 114 of each head may be moveable. For example, a composite tool head is formed of two adjacently disposed tool heads; each capable of picking up a group of articles arranged 2×2. Together the two heads can pick and lift a group of 2×4 articles which, once delivered and placed onto the second conveyor 90 may be parted to place two separate groups of 2×2 articles. Alternatively or additionally, the vacuum cups or other gripping tools 114 of the or each tool head may be relatively moveable. For example, each gripping tool may be slidably mounted on a slide bar (not shown) of the tool head and automated pistons are used to manipulate the relative position of each gripping tool 114. In this way, as articles are placed on the second conveyor, they may also be spaced. In this way, the transfer mechanism also operates to rearrange articles on the second conveyor as they are placed. The rearranging mechanism 18, is, in such an embodiment not necessary.

For example, a tool head comprises 8 moveable gripping tools 114 arranged in a 2×0.8 array. This tool head is aligned with the first conveyor 90 to pick up a group of articles from the incoming streams taking 8 articles from each of the two streams 100, 102. Then, the independently driven arm to which that tool head is coupled, operates to rotate and move the collated group above the second conveyor 88. In alignment with the optional transverse lane dividers 116, the tool head is lowered and its speed matched with the second conveyor to execute deliver. As the tool head is lowered the gripping tools 114 move in the x-y directions of the tool head to space the selected 2×8 array into a 2×2 array and a 2×6 array; or into three 2×2 arrays or into two 2×4 arrays s required by the packaging machine.

Upon reading the foregoing it will be understood that the present invention provides improvements in the field of packaging machinery and article manipulation. The article processing system 10 as well as each of the regulator 86; robotic divider 30 and rearranging mechanism 18 sub-assemblies of the system 10 provide for the adaptable and flexible rearrangement of articles in an efficient manner. It can be appreciated that whereas an irregular or unmetered stream of articles 14 can be conveyed around corners and follow irregular routes to supply various secondary processing stations within the system each of which has a metering apparatus to regulate the pitch of the articles, in other embodiments at the output of the mass conveyor 12, a regulator 86 is provided and the stream 14 of article supplying each of the secondary processing stations 28, 34 is already metered and those secondary processing stations 28, 34 do not necessarily comprise an additional regulator 86.

Various other changes may be made within the scope of the present invention, for example although the creation of a wider outgoing stream 32 has been described in terms of using a robotic divider 30 having tool heads for lifting articles in a 2×6 array it will be understood that tool heads capable of a wide range of configurations are envisaged. Indeed in the field of multiple packaging where it is unusual to package articles in larger configurations than 36 articles, the aforedescribed system offers an adaptable system. It is however clear that the mechanism of creating a metered and organized stream of articles that is wider than the incoming stream of articles is advantageous and organized streams of 3 articles wide; four articles wide; five articles wide and greater than six articles wide can be formed using the robotic divider 30 assembly described herein. It will be understood that although lanes greater than six articles wide are achievable, advantage is lost where very wide lanes are created.

Preferably tool heads capable of lifting a 2×6 arrangement are used because the creation of a 6 article wide outgoing stream, with appropriate transverse lane spacing, allows the rearrangement of at least the following configurations of articles: 1×4; 1×5; 1×6; 2×2; 2×3; 2×4; 2×5; 2×6; 3×4; 3×5; 3×6; 4×4; 4×5; 4×6; 5×5; 5×6 and 6×6. All of these arrangements are used in the field of multiple packaging along with other configurations, though not specifically mentioned are also formable by the apparatus described herein. Additionally, it is envisaged that the lifting tool may take different formats and can be structured such that only 2×4 or 2×3 or other similar configurations of article groups may be lifted. Indeed it is also envisaged that the same selection heads 40a could be used to move less than twelve articles at a time. The tool heads 40a-40j can each by controlled to move to the end of the incoming stream of two articles and select a 2×4 arrangement of articles thus only the trailing eight gripping tools 114 would be deployed. It will be appreciated that faster operation of the robotic divider 30 would be required in such an embodiment if the same throughput of grouped articles compared to a mode of operation where each of the twelve gripping tools 114 is utilized. Therefore preferably the 2×6 tool head is used and is fully utilized when used.

It is envisaged that the robotic divider described herein is adaptable in a number of ways that provides a great versatility in the number and arrangement of articles that can be collected from a first position and disposed in a second position, wherein the first and second positions are angled relative to one another i.e. non-linear. In this way re-configuration and metering of an incoming stream z number of articles wide can be achieved to produce a metered stream of y articles wide that may or may not be spaced from successive groups such that grouping in z by n arrangements is also achievable.

It will be understood that where mechanical aspects of the machinery have been described, it is the function of these elements that is of primary purpose and not the exact type, size and or arrangement disclosed. For example, the lugs 104 are required to be tapered to offer a metering system having adjustable width spacers. In other embodiments the lugs 104 are not specifically triangular. In other embodiments movement of the conveyor of the article stream rather than movement of the first or second lug chain table 94, 96 may be effected to alter the depth of insertion of the lugs 104 into the article stream 14. It will readily be understood that relative movement between the lugs 104 and the article stream 14 is required and a variety of means for achieving that relative movement other than that described herein are encompassed by the present invention. Preferably the relative position of all lugs 104 on the first and second lug chains 92, 94 is adjustable simultaneously. In one embodiment the lugs are each extensively coupled to the lug chain 92, 94.

Furthermore, though a cam system for controlling the movement of the independent arms is preferred, many alterations to the specific structure of the robotic divider 30 described herein are envisaged. For example, in one embodiment fewer than five independent arms are provided; in another, greater than five arms are provided. The independent arms may be driven by a range of controllable drive means including servo motors. It is envisaged in another embodiment that one or more of the independent arms comprises a differently sized tool head for facilitating the assembly of a stream of articles of alternative width. In another envisaged embodiment the drive means 50 associated with each arm does not rotate with the independent arm it drives. Referring to the rearranging mechanism, though a series of hinged arms 130a-130d have been described, it is envisaged that movement of the tool heads 122a-122h in other embodiments is effected by means of a cam and cam follower system; piston system or other known mechanical movement method.

It will be recognised that as used herein, directional references such as "in", "end", "up", "down", "side" do not limit the described feature to such orientation, but merely serve to distinguish relative orientations one another.

The invention claimed is:

1. An article configuration system comprising a first conveyor for transferring articles from an input and a second conveyor, disposed at a non-linear angle relative to the first conveyor, for transferring articles to an output, the article processing system comprising a mechanism for transferring articles from the first conveyor to the second conveyor, said mechanism being structured and arranged to facilitate the reorganisation of articles conveyed by the first conveyor such that when transferred to the second conveyor the articles are disposed in adjacent metered lanes wherein the number of adjacent metered lanes of articles conveyed by the second conveyor is greater than the number of adjacent lanes of articles conveyed by the first conveyor, the mechanism for transferring articles comprising one or more elements each structured and arranged for releasably gripping articles in a configured group for transferring configured groups of articles from a first position to a second position, each of said elements being moveable between the first and second positions independently with respect to other of said elements such that each element is moveable at variable angular velocity between said first and second positions, wherein each element is mounted upon an independently controllable arm for rotational movement of each element and wherein each arm is coupled to its own drive means such that movement of each arm is independently controllable.

2. An article configuration system according to claim 1 wherein the transferring mechanism is operable to lift a number of articles in a group configured to have a transverse number of articles by longitudinal number of articles of N by W and transferring and manipulating said group to said second conveyor such that said number of articles is deposited on said second conveyor in a group configured to have a transverse number of articles by longitudinal number of articles of W by N, wherein N and W are each integer numbers and wherein W is greater than N.

3. An article configuration system according to claim 2 wherein N=2 and W=6.

4. An article configuration system according to claim 1, comprising a rearranging mechanism disposed downstream of said mechanism for transferring articles, said rearranging mechanism operable to lift, relocate and deposit one or more articles thereby to rearrange said articles disposed in a greater number of adjacent metered lanes conveyed by said second conveyor into an outgoing stream of articles having a different configuration.

5. An article processing system comprising a primary conveyor structured and arranged to deliver articles in a stream from an outfeed of a primary processor to one or more secondary processing devices, each of said secondary processing devices comprising a means for metering and configuring articles such that a metered and configured stream of articles is produced by the or each secondary processing device, wherein the or each secondary processing devices comprises an article configuration system according to claim 1, further comprising an apparatus suitable for metering a stream of articles, and comprising a series of regularly positioned lugs, each lug having a leading and trailing edge which leading and trailing edges are tapered with respect to one another and the spacing between articles metered by the apparatus is adjustable by means for altering the extent to which each tapered lug is inserted into an article stream.

6. A transfer device according to claim 1, wherein the drive means for each independent arm is affixed to each independent arm and moves with said independent arm.

7. A transfer device according to claim 6 wherein each element for releasably gripping articles is mounted to an independent arm by means of a first moveable mount coupled to a first guide path, which first guide path is structured and arranged to control the position of said first moveable mount in a first dimension or plane relative to said independent arm and thereby control the position of said element at and between each of said first and second positions.

8. A transfer device according to claim 1, wherein the independently controllable drive means of each arm are operable to drive an element alongside adjacent lanes of articles conveyed by a first conveyor at the same speed as a first conveyor and operable to drive that element alongside adjacent lanes of a second conveyor at the same speed as that second conveyor.

9. A transfer device according to claim 8 wherein between matching the speed of a first conveyor and matching the speed of a second conveyor the controllable drive means is operable to drive the element at an appropriate angular velocity such that the element arrives at the second conveyor in alignment with lanes of that second conveyor and matches the speed of that second conveyor.

10. A transfer device according to claim 1, wherein each element comprises an array of gripping tools, each gripping tool for releasably holding an article, wherein each gripping tool of the array of gripping tools are mounted to the element such that they are each moveable relative to one another for adjusting the relative spacing of articles picked up and placed by the tool head.

11. A transfer device according to claim 1 for use with a second conveyor comprising a series of moveable transverse dividers, wherein the transfer mechanism is operable to deposit a first part of a single group of articles on one side of said moving transverse divider and to deposit a second part of that single group of articles on the other side of said transverse divider.

12. A rearranging mechanism for use in the article configuration system of claim 1, the rearranging mechanism operable to act on an incoming moving stream of articles, the rearranging mechanism having one or more tools operable to grasp one or more articles simultaneously and said one or more tools moveable relative to said incoming moving stream of articles such that said tools are operable to match the velocity of the moving stream for gripping and lifting articles at a first loading position; operable to match the velocity of the moving stream at a second spaced unloading position, and operable to change velocity and/or position upstream or downstream relative to the moving articles and/or transverse position relative to the moving articles such that said second position is spaced longitudinally and/or transversely relative to said first position and thereby the rearranging mechanism is operable to rearrange an incoming stream of articles into an outgoing stream of articles in spaced groups having a different configuration relative to that of the incoming stream of articles.

13. An article configuration system comprising a first conveyor for transferring articles from an input and a second conveyor, disposed at a non-linear angle relative to the first conveyor, for transferring articles to an output, the article processing system comprising a mechanism for transferring articles from the first conveyor to the second conveyor, said mechanism being structured and arranged to facilitate the reorganisation of articles conveyed by the first conveyor such that when transferred to the second conveyor the articles are disposed in adjacent metered lanes wherein the number of adjacent metered lanes of articles conveyed by the second conveyor is greater than the number of adjacent lanes of articles conveyed by the first conveyor, the mechanism for transferring articles comprising one or more elements each structured and arranged for releasably gripping articles in a configured group for transferring configured groups of articles from a first position to a second position, each of said elements being moveable between the first and second positions independently with respect to other of said elements such that each element is moveable at variable angular velocity between said first and second positions, said apparatus being suitable for metering a stream of articles, and comprising a series of regularly positioned lugs, each lug having a leading and trailing edge which leading and trailing edges are tapered with respect to one another and the spacing between articles metered by the apparatus is adjustable by means for altering the extent to which each tapered lug is inserted into an article stream.

14. Apparatus according to claim 13 comprising an endless conveyor for holding the series of regularly positioned lugs, the endless conveyor comprising a working reach for conveying articles at regular pitch by means of the regularly positioned lugs being disposed between adjacent articles, said leading and trailing edges being shaped such that the width of the lug increases from a tip of the lug furthest from the endless conveyor to a rear of the lug closest to the endless conveyor, the lugs being arranged such that by adjusting the position of the lugs relative to a stream of articles being metered, each lug provides a greater or lesser spacer between adjacent articles and thereby the apparatus is adaptable to meter a first stream of articles having a first width and subsequently, a second stream of articles having a second different width, at the same regular pitch.

* * * * *